United States Patent
Sugitani

(10) Patent No.: US 9,661,685 B2
(45) Date of Patent: May 23, 2017

(54) WIRELESS COMMUNICATION SYSTEM AND COMMUNICATION DEVICE THEREFOR

(71) Applicant: Panasonic Intellectual Property Management Co., Ltd., Osaka (JP)

(72) Inventor: Toshiyuki Sugitani, Saga (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 61 days.

(21) Appl. No.: 14/264,950

(22) Filed: Apr. 29, 2014

(65) Prior Publication Data

US 2014/0334375 A1    Nov. 13, 2014

(30) Foreign Application Priority Data

May 8, 2013  (JP) ................................ 2013-098535
Jun. 12, 2013 (JP) ................................ 2013-123548

(51) Int. Cl.
| | |
|---|---|
| *H04B 7/15* | (2006.01) |
| *H04W 84/20* | (2009.01) |
| *H04L 1/18* | (2006.01) |
| *H04B 7/155* | (2006.01) |
| *H04L 1/00* | (2006.01) |

(52) U.S. Cl.
CPC ........... *H04W 84/20* (2013.01); *H04L 1/1835* (2013.01); *H04B 7/15507* (2013.01); *H04L 2001/0097* (2013.01)

(58) Field of Classification Search
None
See application file for complete search history.

(56) References Cited

U.S. PATENT DOCUMENTS

2005/0180327 A1* 8/2005 Banerjee ............... H04L 47/10
                                                                  370/236
2013/0155938 A1* 6/2013 Smith ................... H04L 69/163
                                                                  370/315

FOREIGN PATENT DOCUMENTS

| JP | 09-284261    A | 10/1997 |
| JP | 2001-069174  A | 3/2001  |
| JP | 2005-286752  A | 10/2005 |
| JP | 2006-032998  A | 2/2006  |

(Continued)

OTHER PUBLICATIONS

English Translation of Japanese Office Action dated Feb. 17, 2015, for corresponding JP Application No. 2013-098535, 2 pages.

*Primary Examiner* — Huy D Vu
*Assistant Examiner* — Teisha D Hall
(74) *Attorney, Agent, or Firm* — Seed IP Law Group LLP

(57) ABSTRACT

In a wireless communication system for performing a wireless communication based on a time division method between two wireless communication devices, data packets are transmitted from one wireless communication device to another. If the other wireless communication device fails to receive a packet in a correct order or has received a packet that does not coincide with a scheduled packet sequence number, the incorrectly received packet is stored in a storage unit, and released after the packet that is correctly received later so that the packets are obtained in the correct order. When the scheduled packet number fails to be updated in a certain frame, and the scheduled packet fails to be received in a succeeding frame, the other wireless communication device transmits a resend request in the succeeding frame.

16 Claims, 19 Drawing Sheets

(56) References Cited

FOREIGN PATENT DOCUMENTS

| JP | 2006-121394 A | 5/2006 |
|----|---------------|--------|
| JP | 2011-101225 A | 5/2011 |

* cited by examiner

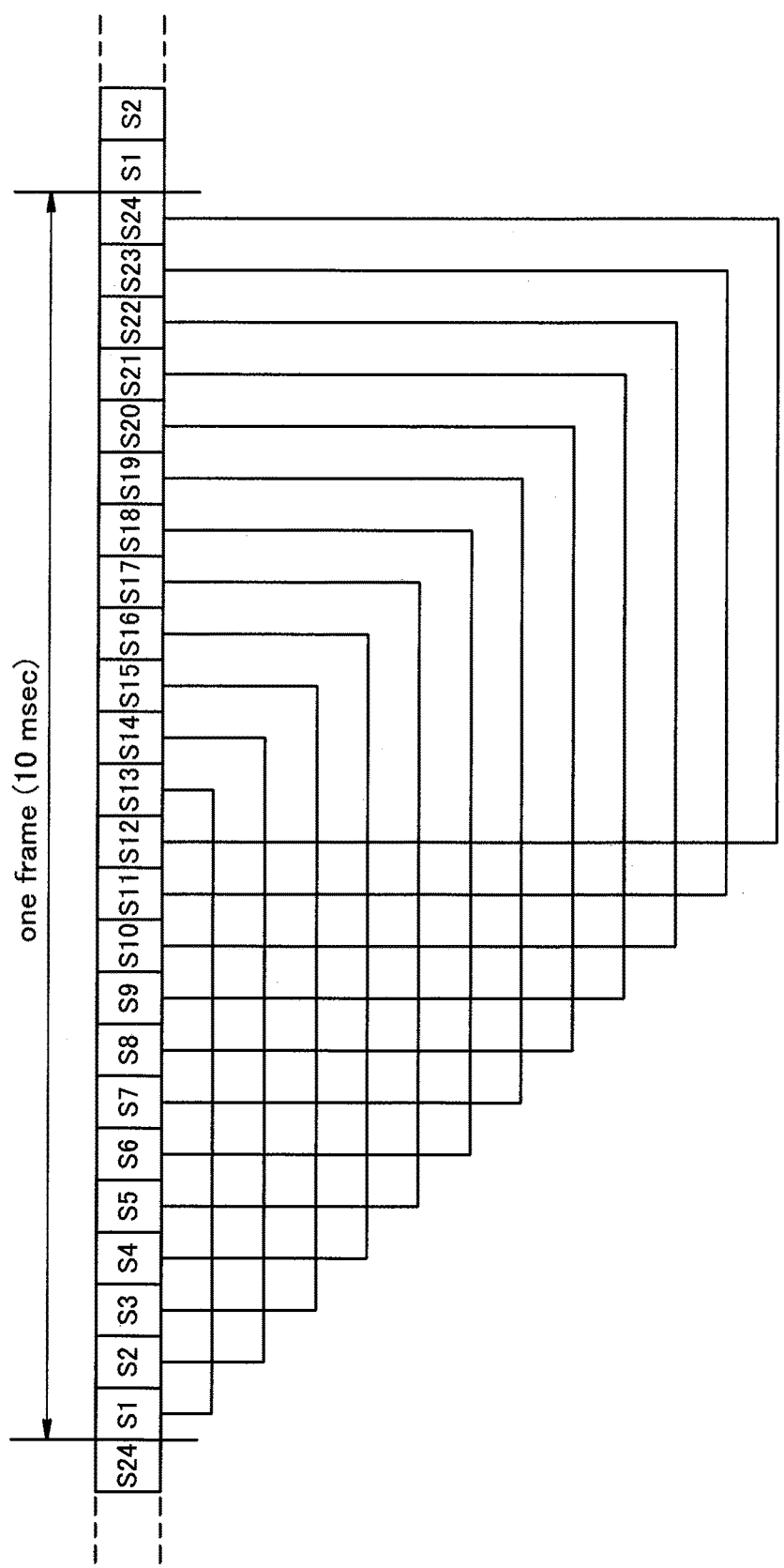

Fig.8a

| F1 | F2 | F3 |
|---|---|---|
| synch signal | control data | CRC1 |

Fig.8b

| F1 | F2 | F3 | F4 | F5 |
|---|---|---|---|---|
| synch signal | control data | CRC1 | information data | CRC2 |

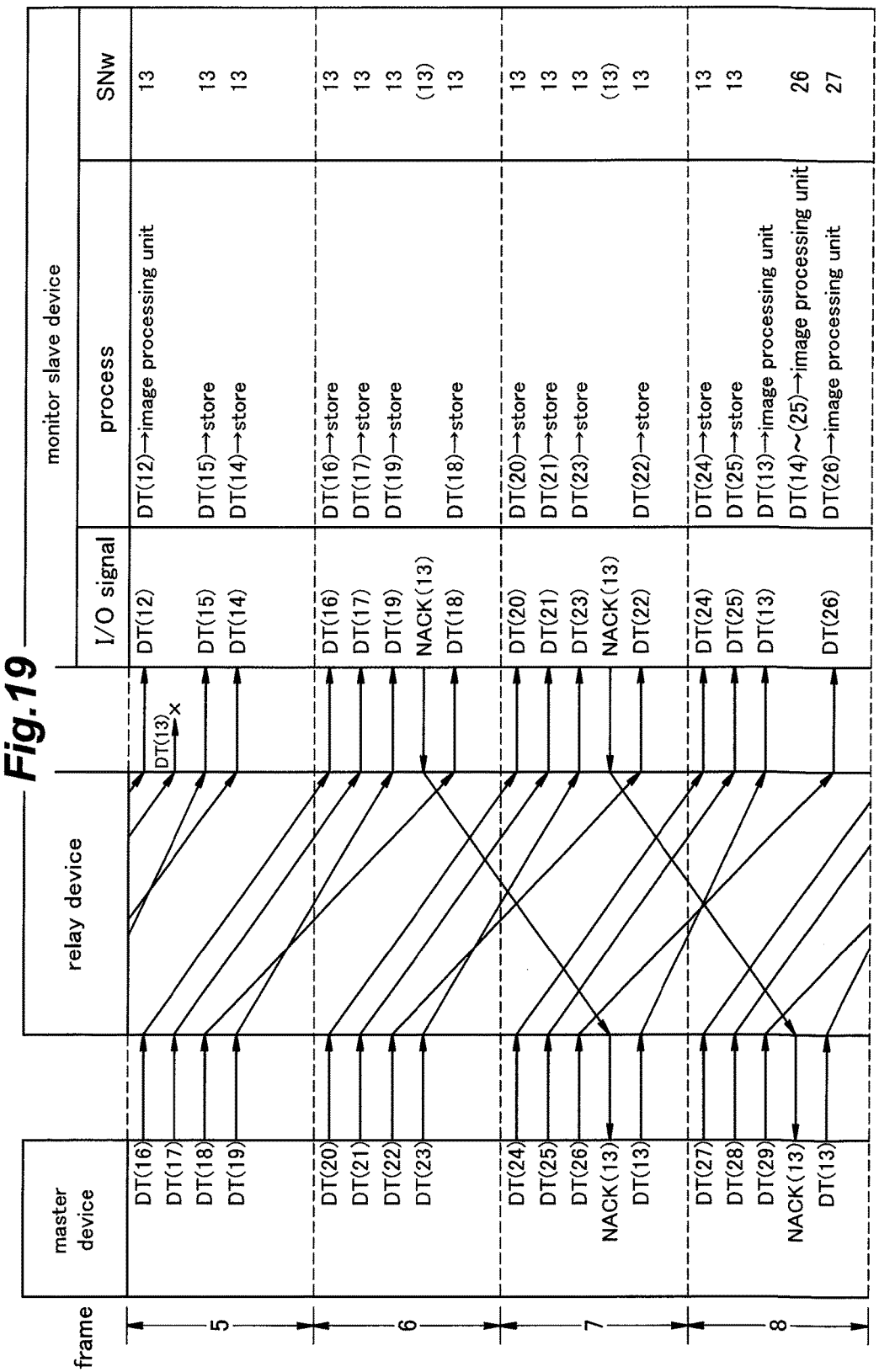

WIRELESS COMMUNICATION SYSTEM AND COMMUNICATION DEVICE THEREFOR

TECHNICAL FIELD

The present invention relates to a wireless communication system for allowing a wireless communication between a master device and a slave device via a relay device.

PRIOR ART

In a conventional wireless communication system, errors inevitably occur in transmission and reception at a significantly high rate so that resend requests are made automatically from the receiving end to the transmitting end as required. It was proposed to reserve a control channel for an automatic resend request which allows an automatic and prompt resend control to be performed such that the amount of data that is required to be resent may be minimized. See JP09-284261, for instance.

In the wireless communication device disclosed in JP2006-121394, the length of data that goes into each packet can be adjusted depending on the mode of communication. Each information packet that is to be transmitted by the information data field of each slot includes the image data and the corresponding header that includes the effective information length of the transmission data, the connecting information of the transmission data packet and the sequence number of the information packet. At the receiving end, the received image data is managed according to the sequence numbers of the information packets such that the image data that has been transmitted in a number of packets may be reconstructed according to the sequence numbers of the information packets.

When a wireless camera transmits image data to a master device, each image packet is divided into a number of smaller packets that fit into individual slots. The master device reconstructs the original image according to the header information contained in the image date received from the wireless camera. A communication processing unit of the master device determines if there is any missing sequence number, and if there is a missing sequence number, transmits a resend request (NAK) containing the information of the missing sequence number to request the packet corresponding to the missing sequence number to be resent once again.

In a master and slave wireless communication system, a relay device may be employed so that the state of communication between the master device and the slave device may be ensured even when the quality of communication is relatively poor. The relay device is configured to receive the image data transmitted from the master device, and transmit the received image data to the slave device.

In the relaying process of the relay device, packets may be transmitted and received by using a plurality of time slots defined in each frame according to the TDMA (Time Division Multiple Access) method. In such a case, when the slots are changed in order to avoid the slots that are subjected to external interferences, the sequence numbers of the packets that are received may be reversed. It could be avoided by limiting the choices of the slots used by the transmitting source (such as a camera slave device) for the transmission of packets and the slots used by the relaying device for the transmission of packets, but this causes a delay in the transmission process.

When the sequence numbers of packets that are received by a receiving end are allowed to be reversed from time to time, the receiving end is required to transmit a resend signal (NACK: negative response) to have the packet that is missing or delayed to be transmitted once again over again. However, the transmitting end is required to transmit the packet which was transmitted earlier once again, and this complicates and delays the processing of data.

According to the prior art disclosed in JP2006-121394, the reliability of image transmission can be improved owing to the resend control process, but resend requests are so frequently made that the efficiency of the system is excessively impaired because a resend request is made as soon as an expected packet is missed, and even in the simplest case of the reversing of the sequence numbers of two successive packets, a resend request is made.

SUMMARY OF THE INVENTION

In view of such problems of the prior art, a primary object of the present invention is to provide a wireless communication system that can minimize packet losses while maintaining a high communication efficiency.

A second object of the present invention is to provide a wireless communication system incorporated with a resend control which is both simple and efficient.

A third object of the present invention is to provide a wireless communication system that can be favorably implemented when a relay device is included.

According to the present invention, such objects can be accomplished by providing a wireless communication system for performing a wireless communication based on a time division method between two wireless communication devices, wherein: one of the wireless communication devices is configured to transmit a plurality of packets according to an order of sequence numbers tagged to the packets; and the other wireless communication device comprises a scheduled packet sequence number setting unit for providing a scheduled packet sequence number of each expected packet and updating the scheduled packet sequence numbers provided by the scheduled packet sequence number setting unit according to packets that have been correctly received, a resend control unit for determining a missed packet from an update condition of the scheduled packet sequence number setting unit and transmitting a negative response signal for requesting a resending of the missed packet to the one wireless communication device depending on the determined update condition at a prescribed timing, and a storage unit for temporarily storing at least the packet that is received in an incorrect order, and releasing the stored packet in a correct order in relation with the remaining packets that are received from the one wireless communication device; the resend control unit transmitting the negative response when a scheduled packet sequence number has failed to be updated for a prescribed time interval. The storage unit may store only the packets that are received in an incorrect order, or may store the packets without regards to whether they are transmitted in a correct order or in an incorrect order so as to serve as a buffer unit.

According to the present invention, a negative response or a resend request is not made immediately upon detection of a missing packet, such as in the case of reversing of the order of two consecutive packets, but only after elapsing of a certain time period so that the communication efficiency can be improved, and a communication delay can be minimized.

The present invention further provides a wireless communication method for performing a wireless communication based on a time division method between two wireless communication devices, comprising the steps of: causing one of the wireless communication devices to transmit a plurality of packets according to an order of sequence numbers tagged to the packets; setting a scheduled packet sequence number of each expected packet in the other communication device; updating the scheduled packet sequence numbers according to packets that have been correctly received by the other wireless communication device; temporarily storing at least the packet that is received in an incorrect order; determining a missed packet from an update condition of the scheduled packet sequence number; releasing the stored packet in a correct order in relation with the remaining packets that are received from the one wireless communication device; and transmitting a resend request signal from the other wireless communication device to the one wireless communication device depending on the update condition; wherein when the scheduled packet sequence number has failed to be updated for a prescribed time interval, the other wireless communication device is caused to transmit a resend request signal for the missed packet to the one wireless communication device.

In this case also, a negative response or a resend request is not made immediately upon detection of a missing packet, such as in the case of reversing of the order of two consecutive packets, but only after elapsing of a certain time period so that the communication efficiency can be improved, and a communication delay can be minimized.

Particularly when the system includes a relay device, the packets may be received in an incorrect order due to the need to change time slots for communication owing to the unavailability of the intended slots which may be caused by external interferences or other factors, but the receiving end does not immediately transmits a resend request signal, and stores the packets in a storage unit until the missed packet is received. Once the missed packet has been received, the packets in the storage unit is released so that the correct ordering of the packets may be achieved.

Therefore, a resend request is made only after the elapsing of a certain time period or until the time when the likelihood of receiving the missed packet number becomes adequately low. If the time period is increased, the frequency of transmitting resend requests can be reduced. If the time period is decreased, the waiting period for the missing packet is reduced. The time period may be selected optimally for the given condition for the wireless communication.

According to a preferred embodiment of the present invention, the resend control unit of the other wireless communication device transmits the negative response when a scheduled packet sequence number has failed to be updated for a prescribed time interval and a packet corresponding to the scheduled packet sequence number is not stored in the packet storage unit.

Thereby, the resend request control at the other wireless communication device can be performed in an efficient manner.

According to a certain aspect of the present invention, the one wireless communication device is provided with a storage unit for storing a packet identical to each of the packets transmitted therefrom, the storage unit being configured to discard the oldest packet stored therein and store the new packet when the packet storage unit has become full.

Thereby, upon receiving a resend request, the one wireless communication device is enabled to read out the packet to be resent from the storage unit and transmit it without fail.

According to another aspect of the present invention, the other wireless communication device is configured to set the first scheduled packet sequence number to a sequence packet number of a first packet received by the other wireless communication device.

Thereby, when the other wireless communication device has come within the range of the one wireless communication device at a middle point of transmission therefrom, the other wireless communication device is enabled to correctly receive the transmission from the one wireless communication device.

According to yet another aspect of the present invention, the resend control unit of the other wireless communication device is configured to transmit a positive response at a prescribed timing when the scheduled packet sequence number is updated.

By transmitting a positive response, instead of a negative response, as long as the scheduled packet sequence number is updated at least once in a prescribed time frame even when a failure to receive a packet scheduled for this time frame occurs. Therefore, even when a packet scheduled for a particular frame fails to be received, a resend request is prevented from being made immediately.

According to yet another aspect of the present invention, the resend control unit of the other wireless communication device is configured to transmit a positive response at a prescribed timing when the scheduled packet sequence number is not updated, and no packet is stored in the storage unit.

If the storage unit is empty although the scheduled packet sequence number is not updated in a given time frame, as it may be a case of a simple reversion of successive packets, a positive response, instead of a negative response, may be transmitted so that the communication efficiency may be maintained without transmitting a resend requesting.

According to yet another aspect of the present invention, the scheduled packet sequence number setting unit of the other wireless communication device is configured such that when a packet corresponding to the scheduled packet sequence number is detected in the storage unit, the scheduled packet sequence number is updated to a succeeding packet sequence number.

Thereby, the packets stored in the storage unit can be released therefrom to be combined with the other packets in the correct order. Preferably, this process is repeated until applicable packets are exhausted from the storage unit.

According to a particularly preferred embodiment of the present invention, the one wireless communication device comprises a camera slave device for a monitoring purpose, and the other wireless communication device comprises a master device configured to receive image data from the camera slave device. Preferably, the system further comprises a relay device for relaying packets between the camera slave device and the master device, the relay device including a buffer unit for temporarily storing packets transmitted from the camera slave device to the master device.

According to another particularly preferred embodiment of the present invention, the one wireless communication device comprises a master device configured to receive image data from a camera slave device, and the other wireless communication device comprises a monitor slave device for reconstructing an image from image data transmitted from the master device to the monitor slave device. Preferably, the system further comprises a relay device for relaying packets between the master device and the monitor slave device, the relay device including a buffer unit for temporarily storing packets transmitted from the master device.

Preferably, the one wireless communication device is configured to transmit a control signal indicating a sequence number of each current frame to the other wireless communication device, each frame consisting of a plurality of time slots for wireless communication. Typically, the prescribed timing is selected such that the other wireless communication device transmits a resend control signal to the one wireless communication device once in each frame.

BRIEF DESCRIPTION OF THE DRAWINGS

Now the present invention is described in the following with reference to the appended drawings, in which:

FIG. 7 is a diagram showing the structure of a frame;

FIG. 8 is a diagram showing the field structures of a control channel (a) and a communication channel (b);

FIG. 19 is a view similar to FIG. 16 showing a case where a data reception error has occurred.

DESCRIPTION OF THE PREFERRED EMBODIMENT(S)

Figure 1:
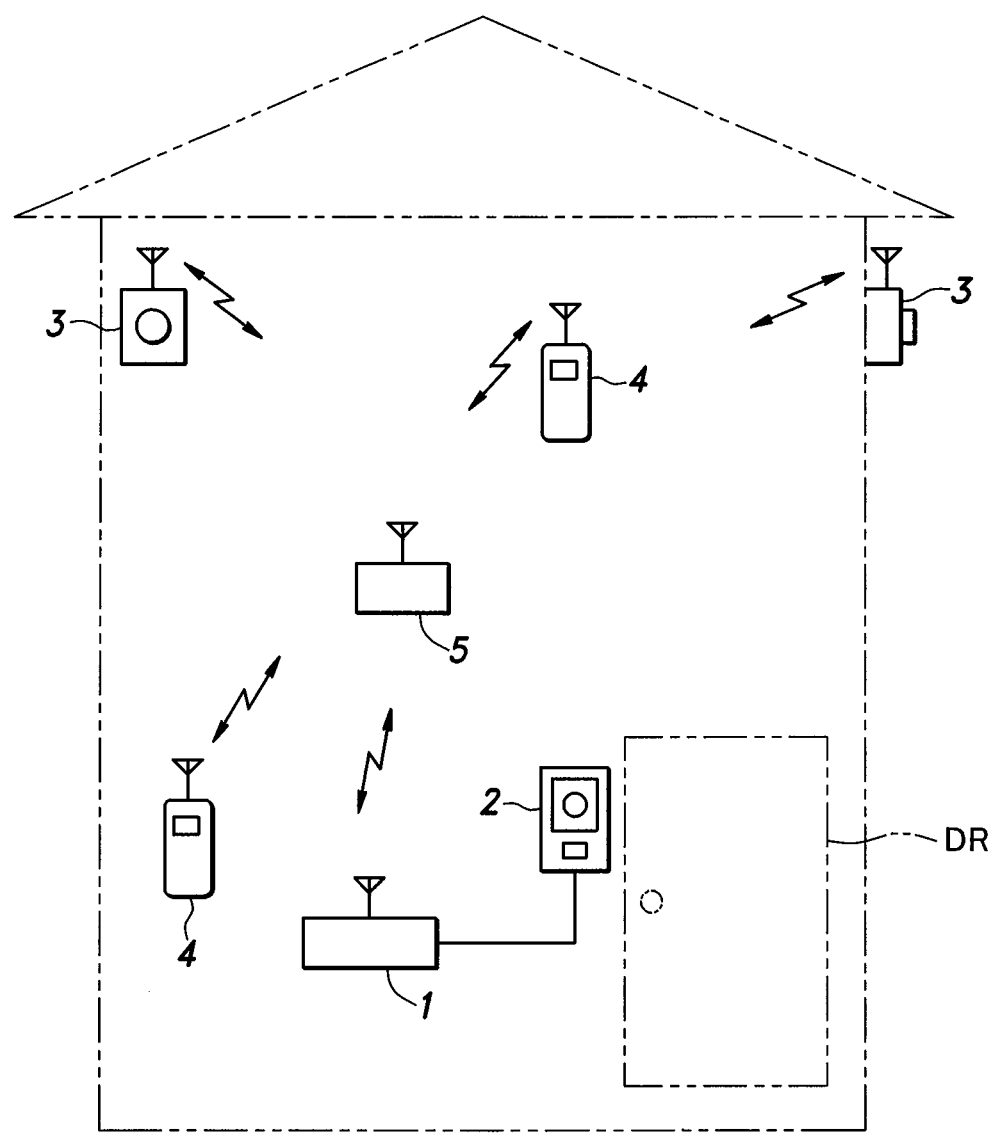
FIG. 1 is a diagram showing the overall structure of a wireless communication system embodying the present invention.

FIG. 1 is a diagram showing the overall structure of a wireless communication system embodying the present invention. A master device 1 is placed in a house, a door phone slave device 2 is placed on the exterior of a door DR to the house or an adjacent part of the exterior of the house, a pair of camera slave devices 3 are placed on the exterior of the house to monitor the outside of the house, and a pair of portable monitor slave devices 4 are placed in the house mostly for use inside the house. The camera slave devices 3 are typically attached to the outer wall of the house. Additionally, a relay device 5 is placed in a suitable part of the house to ensure a favorable communication between the master device 1 and each of the camera slave devices 3 and the monitor slave devices 4.

Figure 2:
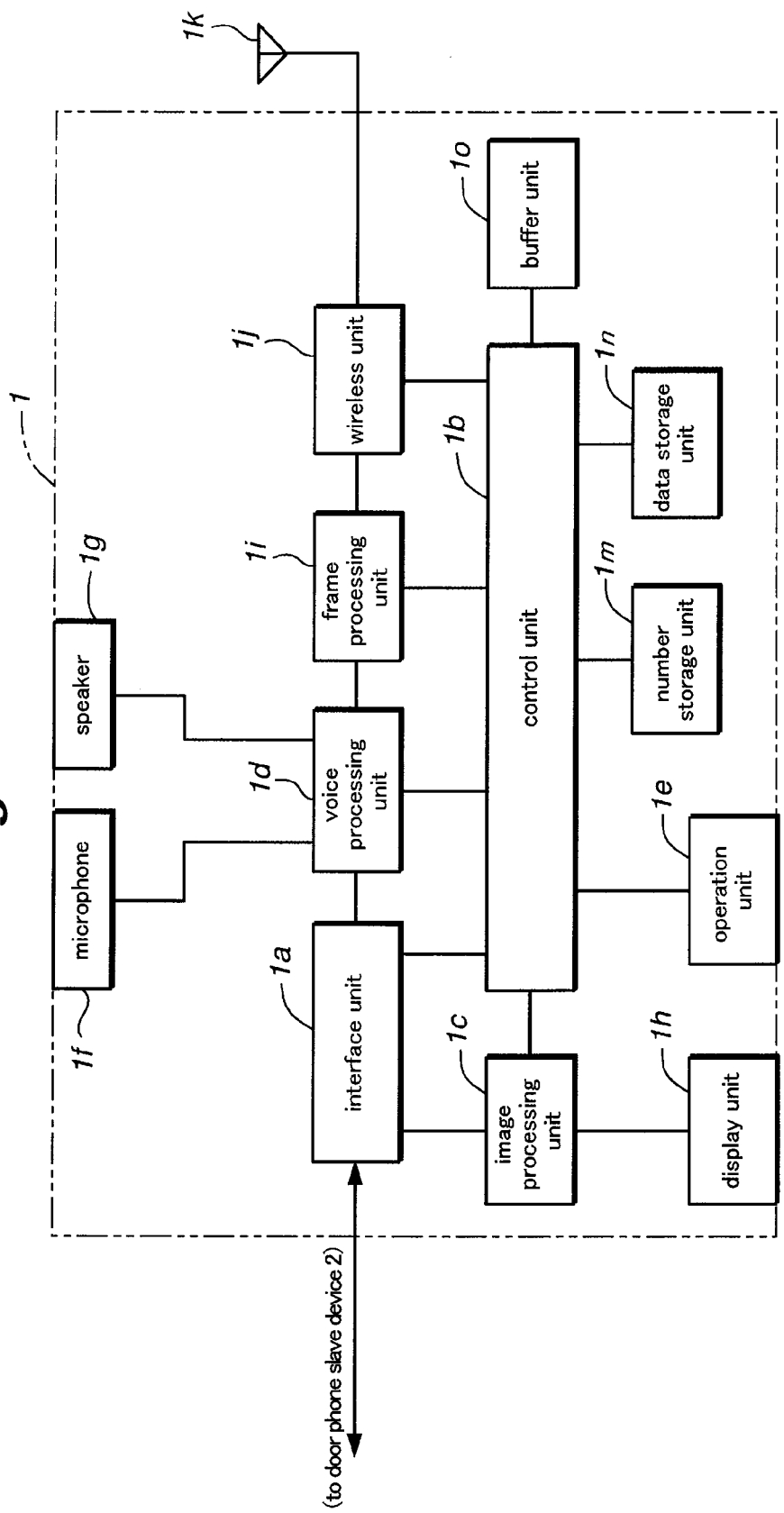
FIG. 2 is a block diagram showing the structure of a master device.

FIG. 2 is a block diagram showing the structure of the master device 1. The master device 1 is provided with an interface unit 1a for exchanging signals with the door phone slave device 2 via wire and a control unit 1b connected to the interface unit 1a to control the overall operation of the master device 1. If desired, the communication between the master device 1 and the door phone slave device 2 may also be performed via a wireless link.

In this system, the master device 1 is configured to transmit image data to the monitor slave devices 4. For this purpose, the master device 1 is provided with the function to transmit image data to each monitor slave device 4 and the function (resend control unit) to resend image data to the monitor slave device 4 upon receiving a request from the monitor slave device 4 via a wireless link as will be described hereinafter.

In this system, the master device 1 is configured to receive image data from the camera slave devices 3 via a wireless link as will be discussed hereinafter. For this purpose, the control unit 1b is provided with the function (scheduled packet sequence number setting unit) to manage the sequence number (scheduled packet sequence number) of the packet of the image data that is expected to be received following the packet most recently received correctly from each camera slave device 3.

The master device 1 further comprises an image processing unit 1c connected to the control unit 1b and the interface unit 1a, a voice processing unit 1d connected to the control unit 1b and the interface unit 1a, and an operation unit 1e connected to the control unit 1b to transmit commands entered from button switches (not shown in the drawings) of the master device 1 to the control unit 1b. The voice processing unit 1d of the master device 1 is connected to a microphone 1f and a speaker 1g, and the image processing unit 1c is connected to a display unit 1h typically including an LCD panel.

The master device 1 further comprises a frame processing unit 1i connected to the control unit 1b and the voice processing unit 1d, and a wireless unit 1j connected to the frame processing unit 1i and the control unit 1b. An aerial antenna 1k for wireless communication is connected to the wireless unit 1j.

The control unit 1b of the master device 1 is connected to a buffer unit 1o for temporarily storing a certain amount of image data which is to be forwarded from the door phone slave device 2 and the camera slave devices 3 to the monitor slave devices 4. For instance, when the master device 1 receives image data from one of the camera slave devices 3 and forwards it to one of the monitor slave devices 4, part of the image data to be forwarded to the monitor slave device 4 is temporarily stored in this buffer unit 1o before being forwarded to the monitor slave device 4 via the wireless unit 1j thereof.

The control unit 1b of the master device 1 is also connected to a sequence number storage unit 1m and a data storage unit 1n. When the master device 1 receives packets transmitted from each camera slave device 3 in the order of the sequence numbers assigned to the packets, the packets are stored in the data storage unit 1*n* so that appropriate measures may be taken if the delivery of any packets from the camera slave device 1 is delayed or the packets are received in incorrect orders. The order numbers of the stored packets are stored in the sequence number storage unit 1*m* as stored sequence numbers SNm.

Figure 3:
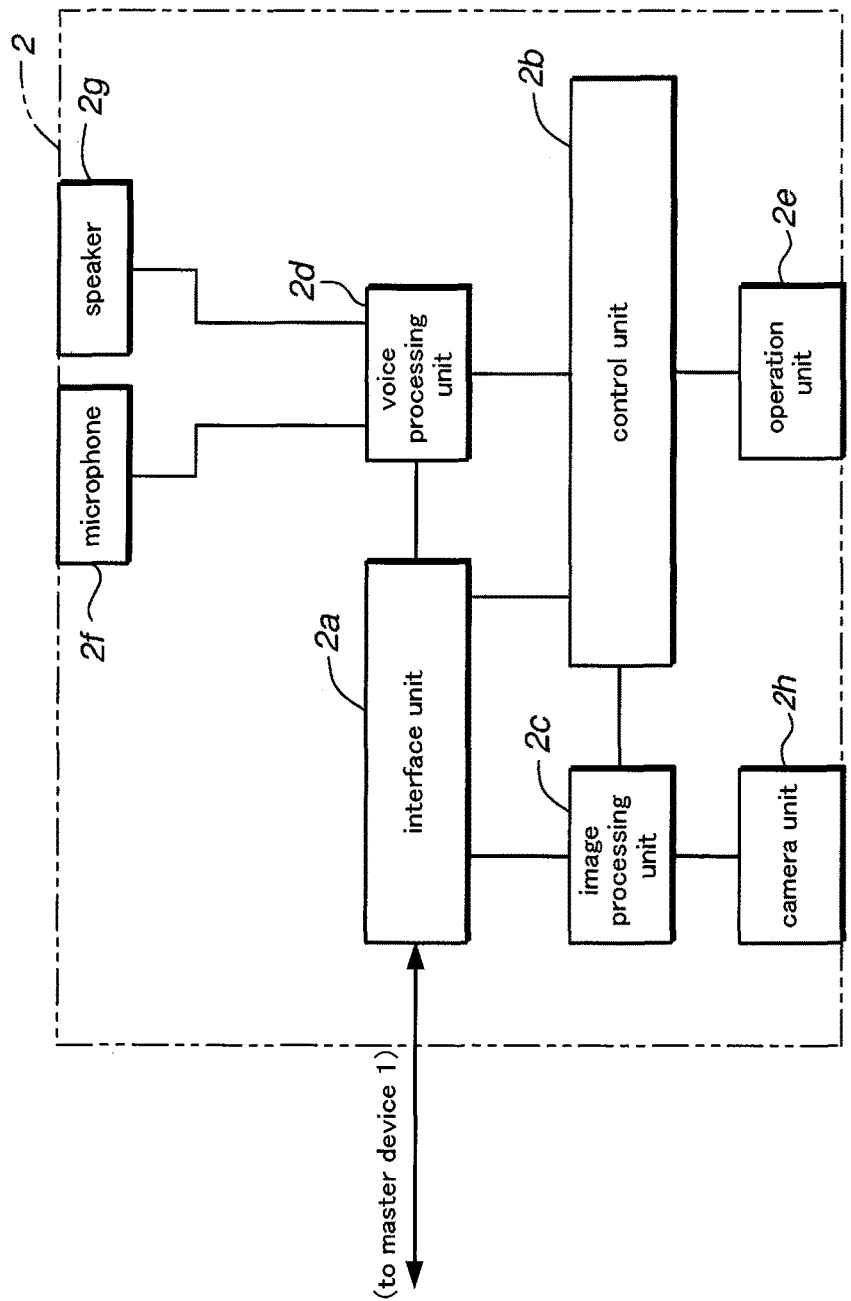
FIG. 3 is a block diagram showing the structure of a door phone slave device.

FIG. 3 is a block diagram showing the structure of the door phone slave device 2. The door phone slave device 2 comprises an interface unit 2*a* for exchanging signals with the master device 1 via wire in the illustrated embodiment, a control unit 2*b* connected to the interface unit 2*a* and responsible for overall control of the door phone slave device 2, an image processing unit 2*c* connected to the interface unit 2*a* and the control unit 2*b*, a voice processing unit 2*d* connected to the interface unit 2*a* and the control unit 2*b*, and an operation unit 2*e* connected to the control unit 2*b* to transmit commands entered from button switches of the door phone slave device 2 to the control unit 2*b*. The voice processing unit 2*d* of the door phone slave device 2 is connected to a microphone 2*f* and a speaker 2*g*, and the image processing unit 2*c* is connected to a camera unit 2*h* for capturing the image on the outside of the door DR.

Figure 4:
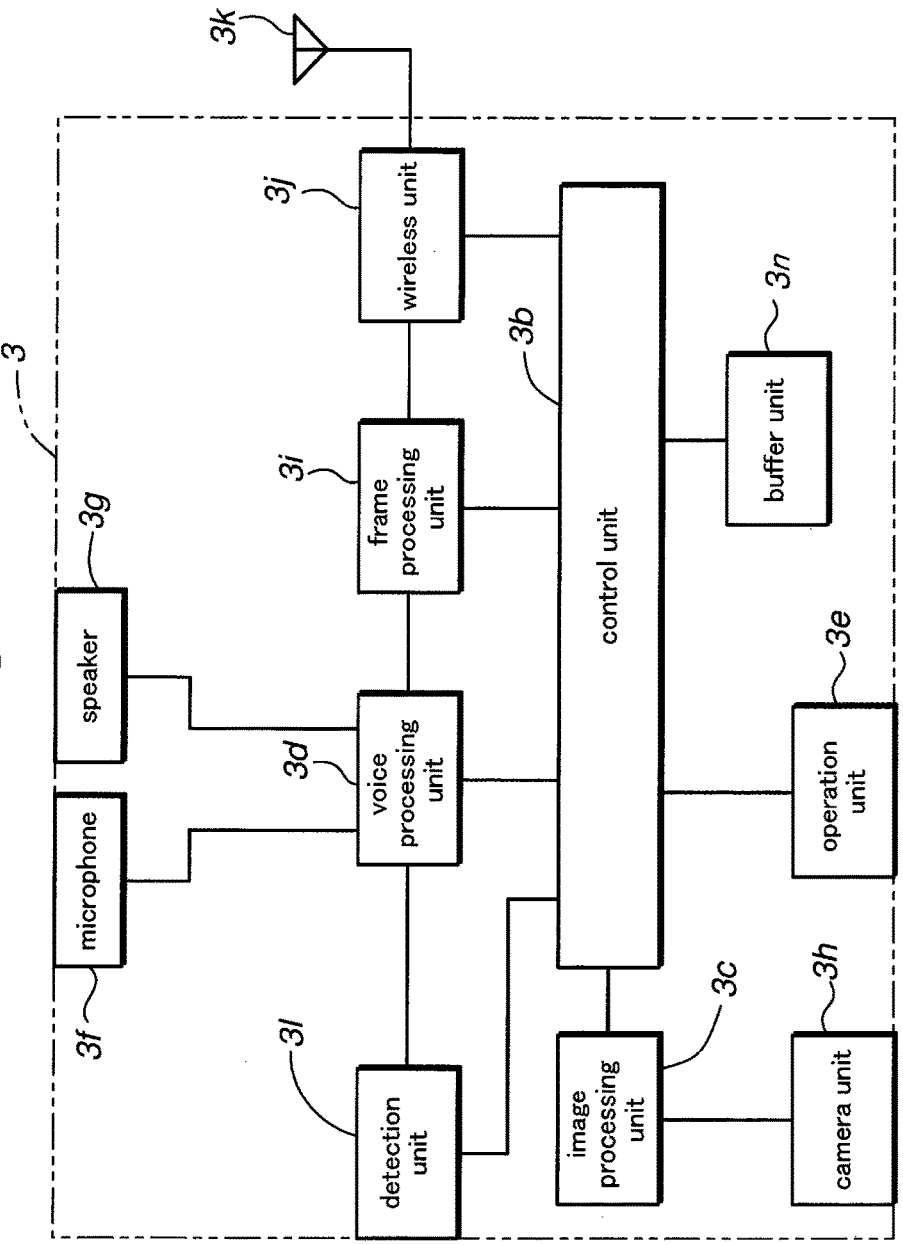
FIG. 4 is a block diagram showing the structure of a camera slave device.

The two camera slave devices 3 may be similarly constructed, and FIG. 4 is a block diagram showing the structure of one of the camera slave devices 3. The camera slave device 3 comprises a control unit 3*b* responsible for the overall control of the camera slave device 3, an image processing unit 3*c* connected to the control unit 3*b*, a voice processing unit 3*d* connected to the control unit 3*b* and an operation unit 3*e* connected to the control unit 3*b* to transmit commands entered from button switches (not shown in the drawings) of the camera slave device 3 to the control unit 3*b*.

The voice processing unit 3*d* of the camera slave device 3 is connected to a microphone 3*f* and a speaker 3*g*, and the image processing unit 3*c* is connected to a camera unit 3*h* for capturing the image on the outside of the house. The camera slave device 3 further comprises a frame processing unit 3*i* connected to the control unit 3*b* and the voice processing unit 3*d*, and a wireless unit 3*j* connected to the frame processing unit 3*i* and the control unit 3*b*. An aerial antenna 3*k* for wireless communication is connected to the wireless unit 3*j*. Additionally, the control unit 3*b* of the camera slave device 3 is connected to a detecting unit 3*l* including a human sensor that may consist of an infrared sensor.

The control unit 3*b* of the camera slave device 3 is connected to a buffer unit 3*n* for temporarily storing a certain amount of image data which is forwarded from the image processing unit 3*c*. A certain part of the image data that is to be transmitted from the camera slave device 3 to the master device 1 is temporarily stored in the buffer unit 3*n* before being forwarded to the master device 1 via the wireless unit 3*j* thereof as required. When a resend request is made by the master device 1, the transmission packet data stored in the buffer unit 3*n* is read out and forwarded to the master device 1.

Figure 5:
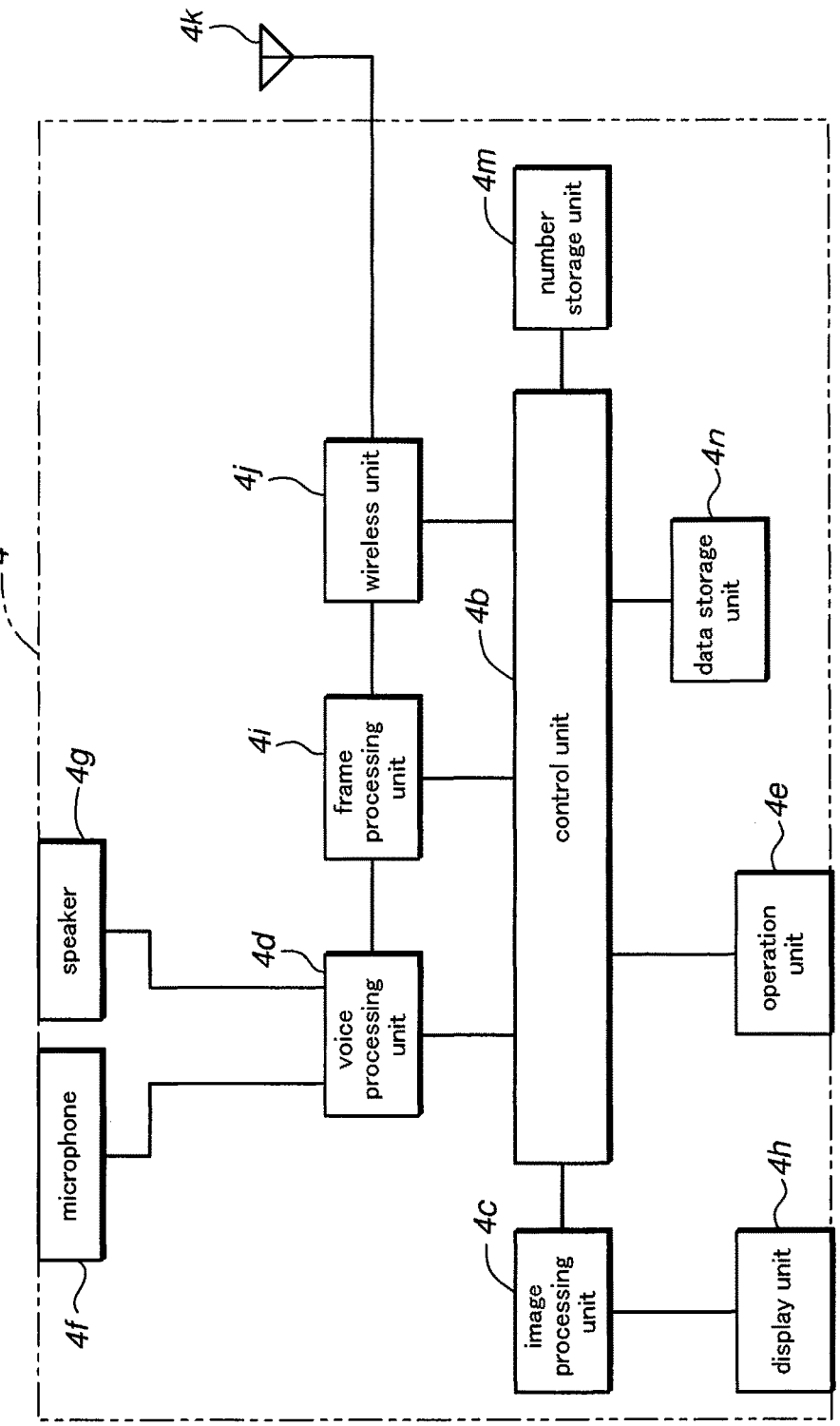
FIG. 5 is a block diagram showing the structure of a monitor slave device.

The two monitor slave devices 4 may be similarly constructed, and FIG. 5 is a block diagram showing the structure of one of the monitor slave devices 4. The monitor slave device 4 comprises a control unit 4*b* responsible for the overall control of the monitor slave device 4, an image processing unit 4*c* connected to the control unit 4*b*, a voice processing unit 4*d* connected to the control unit 4*b* and an operation unit 4*e* connected to the control unit 4*b* to transmit commands entered from button switches of the monitor slave device 4 to the control unit 4*b*.

The control unit 4*b* is provided with a scheduled packet sequence number setting unit for managing the sequence number of the packet that is expected to be received and if there is any shortage of image data, requesting such image data to be sent once again to the source of the image data (such as the master device 1 and the relay device 5). The sequence number produced by the scheduled packet sequence number setting unit is updated when the correct packet is received from the master device 1 such that the sequence number following that of the correctly received packet is recorded by the scheduled packet sequence number setting unit as the sequence number of the packet which is expected to be received thereafter.

The voice processing unit 4*d* of the monitor slave device 4 is connected to a microphone 4*f* and a speaker 4*g*, and the image processing unit 4*c* is connected to a display unit 4*h* typically including an LCD panel. The monitor slave device 4 is further provided with a frame processing unit 4*i* connected to the control unit 4*b* and the voice processing unit 4*d*, and a wireless unit 4*j* connected to the frame processing unit 4*i* and the control unit 4*b*. An aerial antenna 4*k* for wireless communication is connected to the wireless unit 4*j*.

The control unit 4*b* of the monitor slave device 4 is also connected to a sequence number storage unit 4*m* and a data storage unit 4*n*. When the monitor slave device 4 receives packets transmitted from the master device 1 in the order of the sequence numbers assigned to the packets, the packets are stored in the data storage unit 4*n*, and the sequence numbers of the stored packets are stored in the number storage unit 4*m* as stored sequence numbers SNm.

Figure 6:
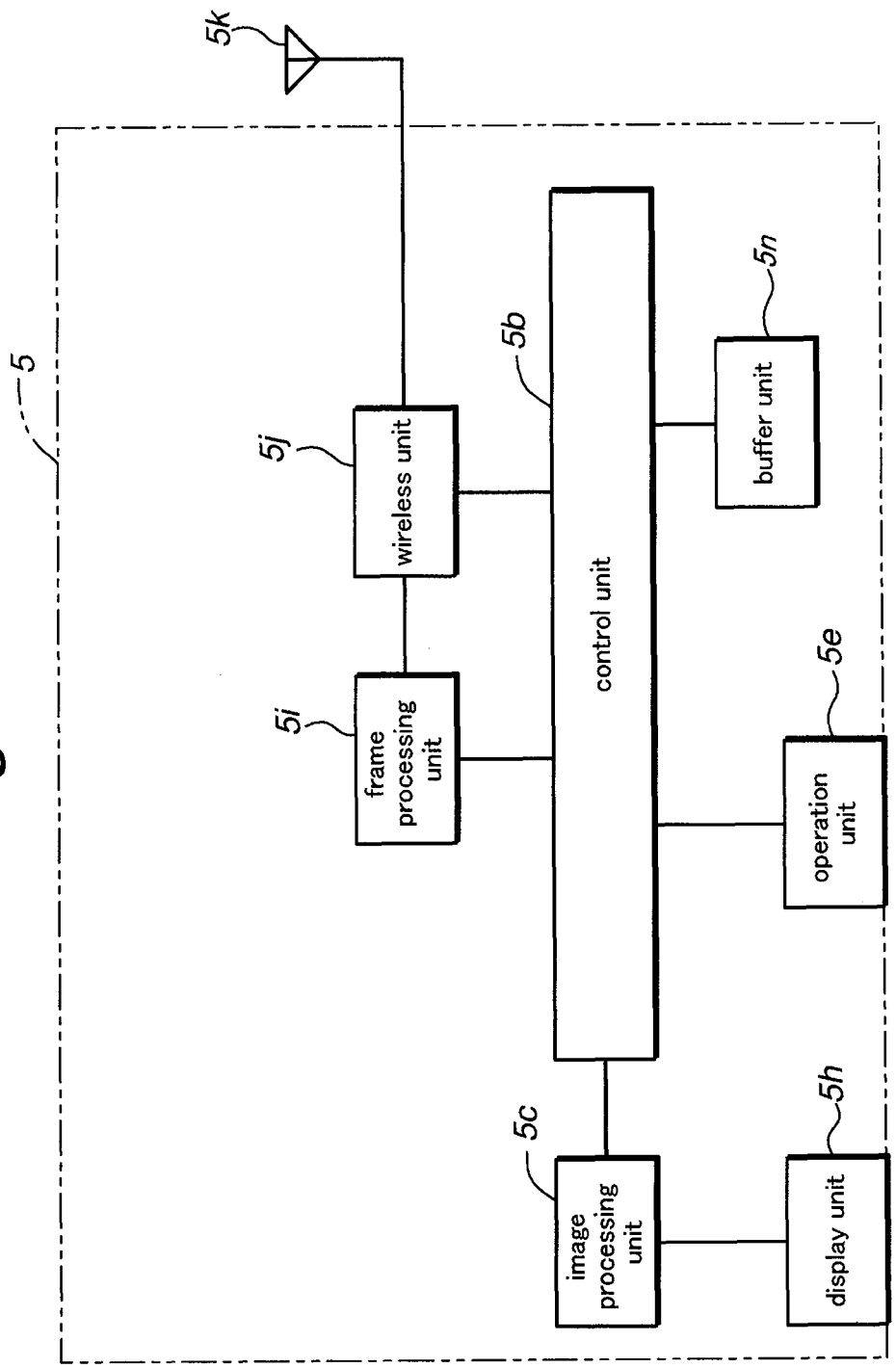
FIG. 6 is a block diagram showing the structure of a relay device.

FIG. 6 is a block diagram showing the structure of the relay device 5. The relay device 5 comprises a control unit 5*b* responsible for the overall control of the relay device 5, an image processing unit 5*c* connected to the control unit 5*b*, a voice processing unit 5*d* connected to the control unit 5*b* and an operation unit 5*e* connected to the control unit 5*b* to transmit commands entered from button switches of the camera slave device 5 to the control unit 5*b*.

The image processing unit 5*c* is connected to a display unit 5*h* consisting of an LCD panel or the like to display the condition of wireless communication (such as synchronism with the master device 1). The relay device 5 further comprises a frame processing unit 5*i* connected to the control unit 5*b* and a wireless unit 5*j* connected to the frame processing unit 5*i* and the control unit 5*b*. An aerial antenna 5*k* for wireless communication is connected to the wireless unit 5*j*.

The relay device 5 further comprises a buffer unit 5*n* that temporarily stores received packets forwarded from a transmission source.

For instance, when the relay device 5 relays communication between one of the camera slave device 3 and the master device 1, the buffer unit 5*n* temporarily stores the packets (image data and/or voice data) received from the camera slave device 3, and the packets stored in the buffer unit 5*n* are read out when processing the following frame to be transmitted to the master device 1 via a plurality of slots. Similarly, the packets (image data and/or voice data) received from the master device 1 are stored in the buffer unit 5*n*, and are read out when processing the following frame to be transmitted to the camera slave device 3.

When the relay device 5 relays communication between one of the monitor slave device 4 and the master device 1, the buffer unit 5*n* temporarily stores the packets (image data and/or voice data) received from the master device 1, and the packets stored in the buffer unit 5*n* are read out when processing the following frame to be transmitted to the monitor slave device 4 via a plurality of slots. Similarly, the packets (image data and/or voice data) received from the camera slave device 4 are stored in the buffer unit 5n, and are readout when processing the following frame to be transmitted to the master device 1.

The mode of controlling the wireless communication in this wireless communication system is described in the following.

FIG. 7 is a diagram showing the structure of a frame in a time division multiplexing (TDM) communication according to the present invention. This communication is performed between the master device 1 and each of the slave devices 3 and 4. In the illustrated embodiment, each frame is transmitted at the interval of 10 msec, for instance, according to the domestic DECT (Digital Enhanced Cordless Telecommunications) standard which is based on the standard developed by ETSI (European Telecommunications Standards Institute). Each frame consists of 24 slots (S1 to S24).

In the illustrated embodiment, of the 24 slots, the first 12 slots are grouped as a first slot group, and the remaining 12 slots are grouped as a second slot group, and each slot in the first slot group is paired with a different one of the slots in the second slot group, and each paired slots form a communication channel. In particular, the positions of the paired slots in the first and second slot groups are the same with each other so that the two slots of each channel are separated by 5 msec. For instance, slot 1 and slot 13 form a channel, slot 2 and slot 14 form a next channel, and so forth.

FIG. 8 is a diagram showing the field structures of a control channel and a communication channel that are used in the TDM communication according to the present invention, and essentially shows the contents of the individual slots. (a) in FIG. 8 shows the field structure of the control channel which is used for transmitting signals for various control purposes in a state where a signal is not being received from any of the door phone slave devices 2 and the camera slave devices 3 (signal non-receiving state) and a state where a signal is being received from any of the door phone slave devices 2 and the camera slave devices 3 (signal receiving state). The signals for control purposes include the signal for resending a signal between the master device 1 and the monitor slave devices 4 (resend control signal). (b) in FIG. 8 shows the field structure of the communication channel. This field structure is used for the slot for use in the control channel and the slot for transmitting the voice signal and/or the image signal when a signal from any one of the door phone slave devices 2 and the camera slave devices 3 is being received.

The field structure shown in (a) of FIG. 8 includes a synch signal field F1, a control data field F2 and a CRC1 field F3. The synch signal field F1 consists of a data string for bit synchronization and a data string for slot synchronization. The control data field F2 includes a frame for TDM communication and control data consisting of such signals as those for slot synchronization and for calling any one of the slave devices 2 to 4. The CRC1 field F3 contains data for error detection corresponding to the data string of the control data field to detect any error in the control data field. The CRC1 field F3 may be followed by an information data field containing voice data and/or image data.

The field structure shown in (b) of FIG. 8 includes a synch signal field F1, a control data field F2, a CRC1 field F3, an information data field F4 and a CRC2 field F5. As mentioned above, this field structure is used when receiving a signal from any one of the door phone slave devices 2 and the camera slave devices 3, and the control data field F2 may contain such data as the control data for activating and ending a communication channel or a service, and the control data for resend control data in data communication. The information data field F4 may contain voice data, image data and resend control data.

Figure 9:
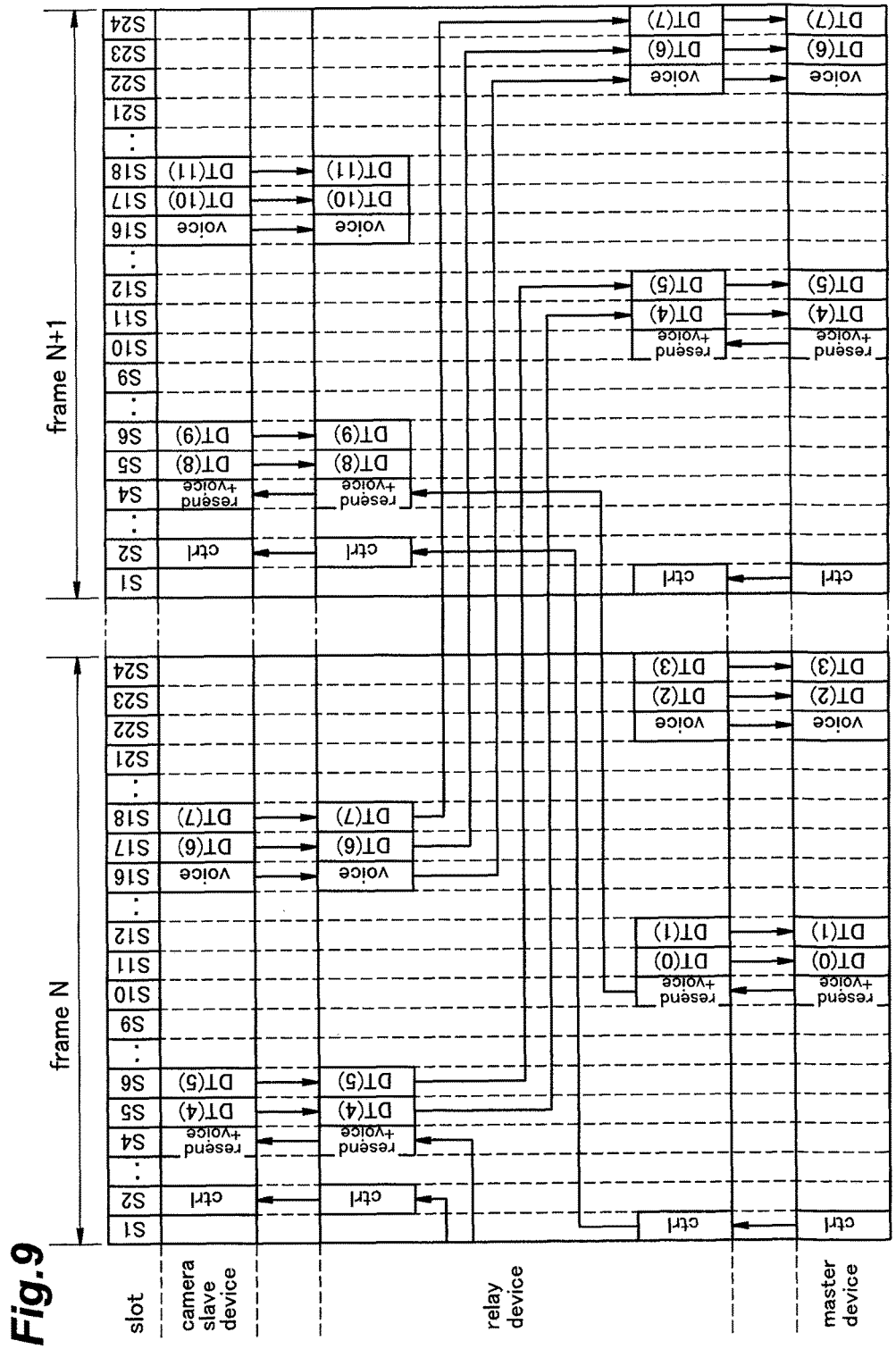
FIG. 9 is a diagram showing a mode of communication between the master device and the camera slave device via the relay device.

FIG. 9 shows an example of communication that may take place between the master device 1 and each camera slave device 3 via a relay device 5. In the illustrated example, the packets transmitted from the camera slave device 3 in frame number N in the order of the packet sequence numbers SN of the packets are forwarded (or relayed) to the master device 1 in the following frame number N+1 via the relay device 5.

In the example illustrated in FIG. 9, in frame number N, the relay device 5 uses slots S1, S10, S11, S12, S22, S23 and S24 for exchanging packets with the master device 1, and slots S2, S4, S5, S6, S16, S17 and S18 for exchanging packets with the camera slave device 3.

More specifically, the relay device 5 receives a control signal transmitted from the master device 1 via slot S1, and a resend control signal and voice data transmitted from the master device 1 via slot S10. The relay device 5 receives image data (packets) DT(4), DT(5), DT(6) and DT(7) via slots S5, S6, S16, S17 and S18, respectively, and stores it in the buffer unit 5n. The relay device 5 also receives voice data transmitted from the camera slave device 3 via slot S16, and stores it in the buffer 5n.

In the following frame, the relay device reads out the data contained in the packets transmitted from the camera slave device 3 and stored in the buffer unit 5n, and transmits it to the master device 1 via slots S11, S12, S23 and S24. The relay device 5 also transmits the voice data transmitted from the camera slave device 3 and stored in the buffer unit 5n to the master device 1 via slot S22.

The relay device 5 stores the voice data received from the master device via slot S10 in the buffer unit 5n, and transmits this voice data stored in the buffer unit 5n to the camera slave device 3 via slot S10 in the following frame. When a resend control signal is transmitted from the master device 1, the relay device 5 receives the resend control signal from the master device 1 via slot S10, and transmits it to the camera slave device 3 via slot S4 in the following frame.

In FIG. 9, the image data contained in the packets transmitted to the master device 1 is represented as image data DT(0), DT(1), DT(2) and DT(3). The same is true with the following description.

FIG. 9 shows the case where the master device 1 transmits a resend control signal via slot S10, and the relay device 5 transmits this resend control signal to the camera slave device 3 via slot S4 of the following frame. When the communication is successfully performed, an affirmative response ACK is transmitted to the camera slave device 3 as the resend control signal. If there is any error such as a missing packet, a negative response NACK is transmitted to the camera slave device 3 as the resend control signal.

Under normal condition where none of the slots are being interfered, communication is continued from frame number N to frame number N+1 having a same slot structure as shown in FIG. 9. As the wireless communication between the master device 1 and the camera slave device 3 is performed via the relay device 5, the data received by the relay device 5 is temporarily stored in the buffer unit 5n, and transmitted in the succeeding frame.

As the volume of image data processed in each frame is significant, the transmission of image data is performed by using a plurality of slots as discussed above. In the illustrated embodiment, four slots are used for this purpose in each frame. The receiving end (master device 1) processes the image data in the order of the sequence numbers SN assigned to the corresponding packets. In the illustrated embodiment, the four pieces of image data (transmitted via the corresponding slots) form a single image frame. In the relay device 5, a slot under interferences may be substituted by another, and this prevents the sequence numbers SN from the relay device 5 to the master device 1 to be consecutive. According to the present invention, a certain control action is taken by the master device 1 in such a situation as will be discussed hereinafter.

Figure 10:
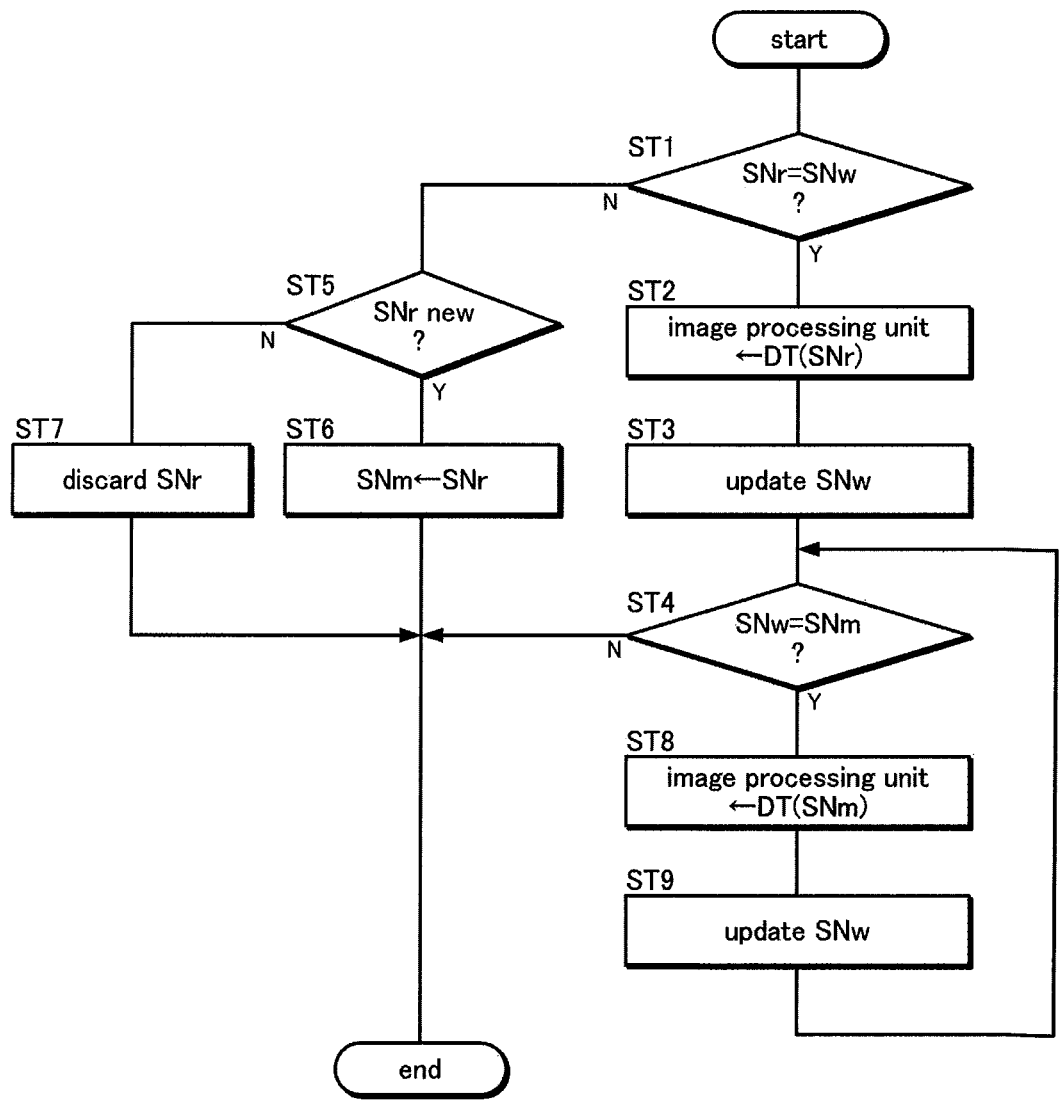
FIG. 10 is a flowchart of a packet reception control in a wireless communication device for receiving packets.

FIG. 10 is a flowchart of a packet reception control in the master device 1 when receiving packets (of image data DT). This control action is mainly performed by the control unit 1b which may be implemented by a computer operating under a computer program. This reception control process is executed immediately following the completion of a communication process via each of the slot S11, S12, S23 and S24 of each frame when the packets are normally received. The relay device 5 relays communication between the camera slave device 3 and the master device 1 in transmitting image data.

Figure 11:
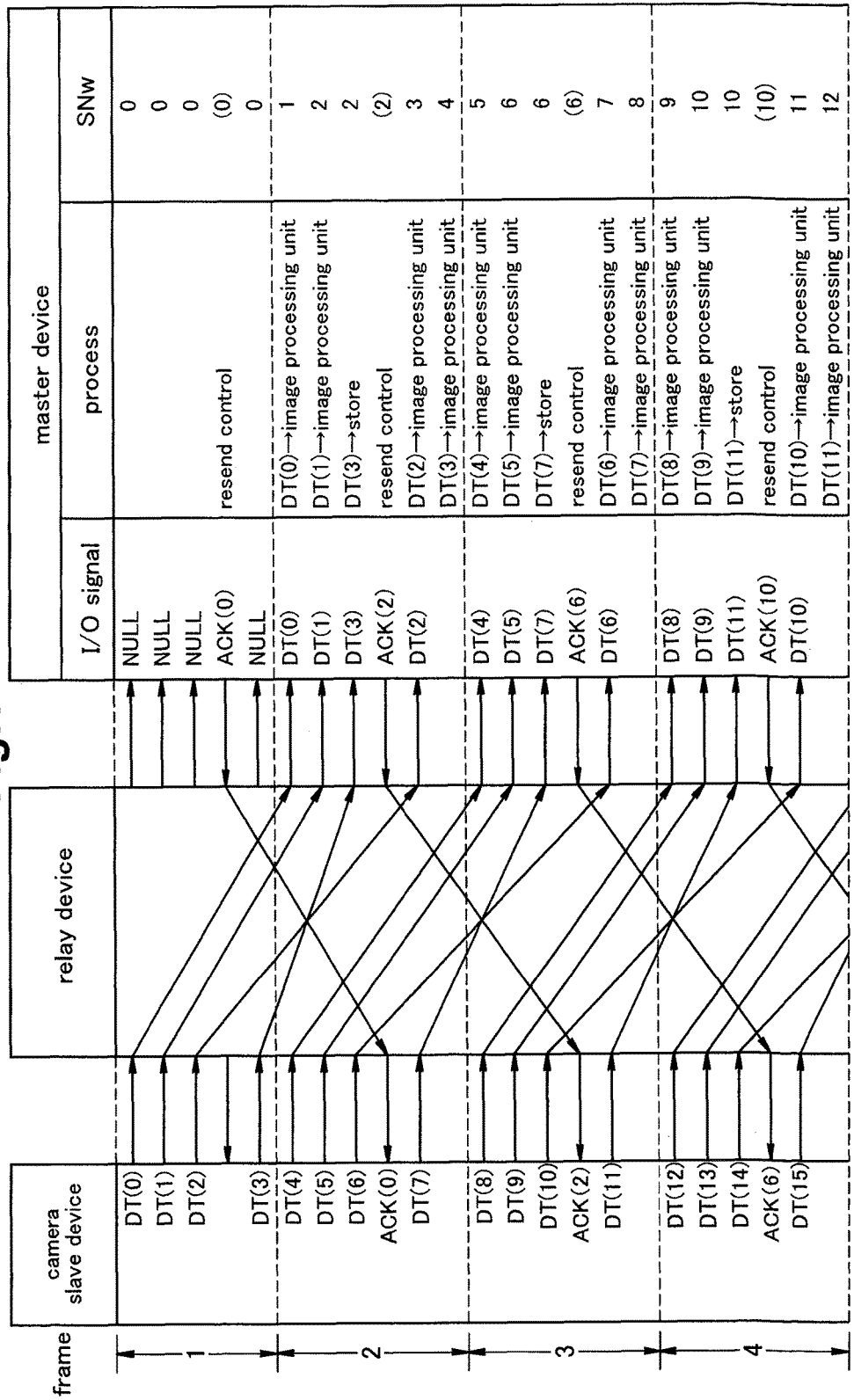
FIG. 11 shows a mode of transmission and reception control between the camera slave device and the master device via the relay device.
Figure 13:
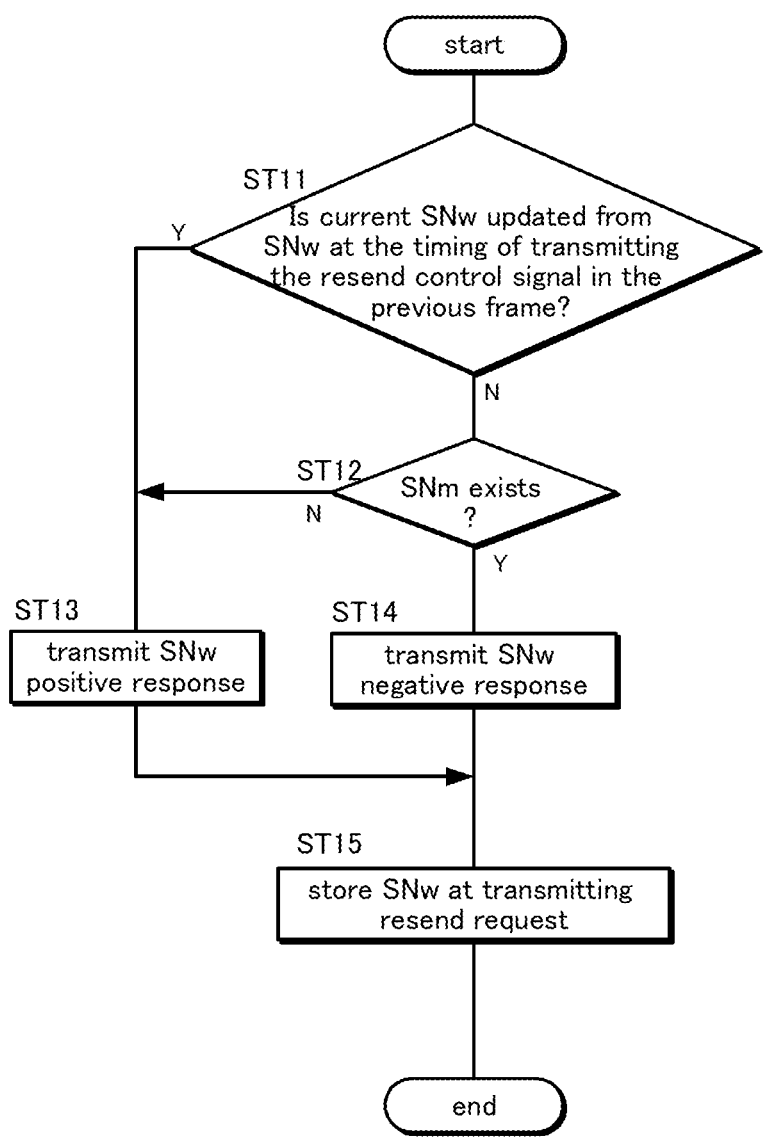
FIG. 13 is a flowchart of transmission control for a resend control signal at the master device.

FIG. 11 shows a mode of transmission and reception control between the camera slave device 3 and the master device 1 via the relay device 5. In FIG. 11, the vertical axis consists of a time axis that progresses from top to bottom, and image data DT is transmitted from the camera slave device 3 in frame 1. The reception signal from the relay device 5 (indicated by the rightward arrow in FIG. 11) is processed as shown in the flowchart of FIG. 10, and the transmission signal from the master device 1 to the relay device 5 (indicated by the leftward arrow in FIG. 11) is processed as shown in the flowchart of FIG. 13 which will be described hereinafter.

In the reception process in step ST1 of FIG. 10, it is determined if the sequence number SNr of the packet that has been received coincides with the scheduled packet sequence number SNw. This determination process is carried out by comparing the scheduled packet sequence number SNw (stored in the sequence number storage unit 1m) and the sequence number SNr of the packet that has been received in the control unit 1b (serving as a resend control unit).

As shown in frame number 1 of FIG. 11, the four pieces of image data DT(0) to DT(3) forming a single frame are transmitted from the camera slave device 3 in that order, and are received by the relay device 5. The numbers in the brackets indicate the sequence numbers n=0, 1, 2, . . . of the packets, and are updated in the camera slave device 3 in the ascending order. For instance, the image data DT(0) corresponds to the packet given with a sequence number SN of 0.

The relay device 5 possesses no received image data DT in frame 1, and transmits a "no signal" signal (NULL) to the master device 1 via the same slot. As the master device 1 possesses no image data DT, the scheduled packet sequence number SNw is 0 as it corresponds to the first image data piece DT(0) to be received. In the example illustrated in FIG. 11, as can be seen in frames 1 and 2, in the processing operation within the relay device 5, following the image data DT(0) and DT(1), instead of the image data DT(2), the relay device 5 transmits the image data DT(3), and only upon receiving a resend control signal from the master device 1, transmits the image data DT(2).

The relay device 5 is configured to handle the slots in a flexible manner so that if any slot is under interferences, other unaffected slots may be selected. A more specific example is described in the following with reference to FIG. 12 which corresponds to the example given in FIG. 9.

Figure 12:
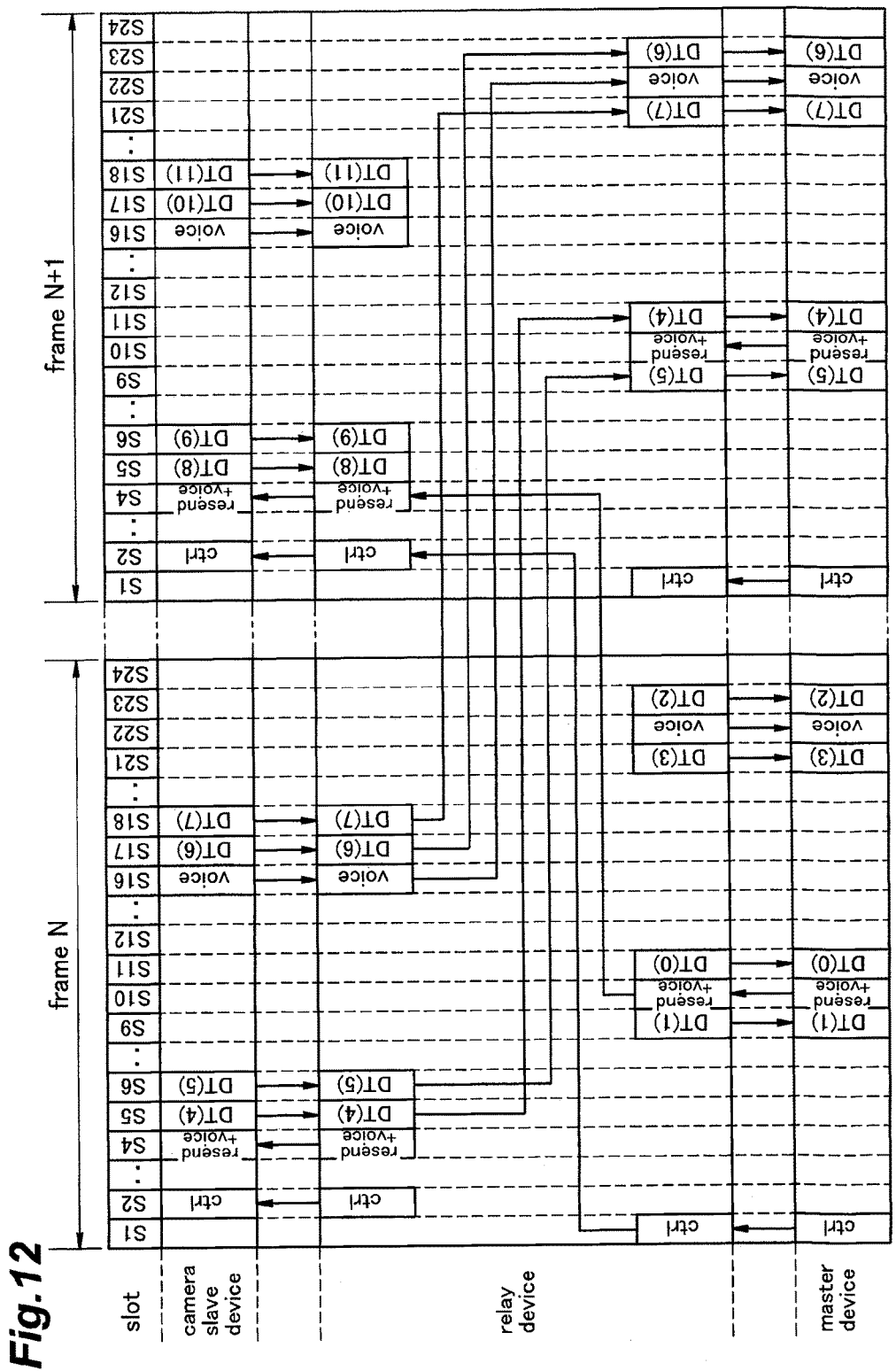
FIG. 12 is a view similar to FIG. 9 showing a case where the time order of some of the data reception is reversed at the master device.

In frame number N+1 in FIG. 12, in order to avoid the influences of interferences, the slots for transmitting image data DT(5) and DT(7) from the relay device 5 to the master device 1 are changed from slot S12 in FIG. 9 to slot S9, and from slot S24 in FIG. 9 to slot S21. Thus, the image data DT(4) and DT(5) received from the camera slave device 3 in frame number N is transmitted to the master device 1 via different slots. More specifically, in the example illustrated in FIG. 12, whereas the image data DT(4) and DT(5) was received from the camera slave device 3 via slots S9 and S6, respectively, in frame number N, the image DT(4) is transmitted to the master device 1 via slot S11, and the image data DT(5) is transmitted to the master device 1 via slot S9, in the succeeding frame number N+1.

Similarly, of the image data DT(6) and DT(7) which was received in frame number N, the image data DT(6) is transmitted to the master device 1 via slot S23 and the image data DT(7) is transmitted to the master device 1 via slot S21, in the succeeding frame number N+1.

The changes in the slots (channels) can be made as required when any intended slots are interfered, and the selection of the slots can be made freely. As a result of such changes in the slots, the sequence of packet transmission could be reversed as happened in the illustrated example.

Referring to FIG. 10, if the sequence number SNr of the packet that has been received is determined to coincide with the scheduled packet sequence number SNw in step ST1 of FIG. 10 (ST1: Yes), the image data DT of the received packet is forwarded to the image processing unit 4c in step ST2.

In the image processing unit 1c of the master device 1, until a plurality of pieces of image data DT(n) to DT(n+3) that are required to reconstruct a frame of image have been received, the process to read out data from the data storage unit 1n and forward the data to the display unit 1h is suspended. Once the reception of the pieces of image data DT(n) to DT(n+3) that are required to reconstruct a frame of image is confirmed, the corresponding image data DT(n) to DT(n+3) is forwarded to the display unit 1h. The display unit 1h combines the pieces of data DT(n) to DT(n+3) to display the combined image on the monitor screen.

In the following step ST3, the scheduled packet sequence number SNw is updated to that of the packet to be received next (n←n+1) before advancing to step ST4. In step ST4, it is determined if the scheduled packet sequence number SNw is the same as the stored sequence number NSm stored in the number storage unit 1m. If it is determined that the scheduled packet sequence number SNw cannot be found in the stored sequence numbers SNm in step ST4, the current routine is concluded. In the initial state, the scheduled packet sequence number SNw is "0".

If the sequence number SNr of the packet for the image data DT which has been received does not agree with the scheduled packet sequence number SNw (No in step ST1), the program flow advances to step ST5.

In step ST5, it is determined if the sequence number SNr of the packet that has been received is new or, in other words, it is determined if a packet having a same sequence number as the packet that has just been normally received was received in the past. If the sequence number SNr of the packet that has been received is new or the sequence number SNr of the packet that has been received is greater than the scheduled packet sequence number SNw (Snr>SNw) (Yes in step ST5), the program flow advances to step ST6.

If the sequence number SNr of the packet that has been received is new, the data contained in the packet given with this sequence number SNr is stored in the data storage unit $1n$ and the corresponding sequence number SNr is stored as the stored sequence number SNm (SNr=SNm).

If the sequence number SNr of the packet that has been received is not new in step ST5 (No in step ST5), the program flow advances to step ST7. Because the packet of this sequence number SNr is already processed, the redundant packet of this sequence number is discarded to avoid any unnecessary use of resources.

If it is determined in step ST4 that the stored sequence numbers SNm include a sequence number that agrees with the scheduled packet sequence number SNw, the program flow advances to step ST8. In this case, in the example of FIG. 11, a reception process for frame number 2 or any subsequent frame number is executed.

In step ST8, the packet whose sequence number SNr coincides with a stored sequence number SNm (=n) is taken out from the data storage unit $1n$, and the image data DT(n) contained in the packet is forwarded to the image processing unit $1c$. The sequence number of the packet that has been taken out is deleted from the stored sequence numbers SNm.

In the following step ST9, the scheduled packet sequence number SNw is updated (n←n+1) similarly as in step ST3, and the program flow returns to step ST4. In this case, steps ST8 and ST9 are repeated until the stored data in the data storage unit $1n$ corresponding to the scheduled packet sequence number SNw is exhausted in step ST4.

Upon completion of steps ST6 and ST7 or when the stored sequence number SNm stored in the sequence number storage unit $1m$ does not agree with the scheduled packet sequence number SNm in step ST4, the control flow of the packet reception in FIG. 10 is concluded. Therefore, even when there is no agreement between SNm and SNw (No in step ST4) or there is any loss or delay (reversed order) in the received packets, the negative response NACK(n) is not immediately transmitted.

FIG. 13 is a flowchart of the control process which is executed when transmitting various control signals from the master device 1 to the camera slave device 3 to determine if a negative response NACK(n) is to be transmitted as a resend signal. In this case also, the control process is performed primarily by the control unit $1b$ which may be implemented by a computer operating under a computer program. This transmission process for a resend control signal (response signal) is performed via (a front end of) a slot (slot S10 in FIG. 10) in each frame allocated for the master device 1 to transmit such a signal.

In the control flow of the transmission process of FIG. 13, in step ST11, it is determined if the scheduled packet sequence number SNw (the scheduled packet sequence number SNw which was previously stored in step ST15 which will be described hereinafter) at the timing of transmitting a control signal from the master device 1 to the camera slave device 3 in the previous control cycle (the previous frame) is different from the latest value of the current scheduled packet sequence number SNw. If it is determined that the scheduled packet sequence number SNw was not updated in step ST11 (No in ST11), the program flow advances to step ST12.

In step ST12, it is determined if there is any image data DT still remaining in the data storage unit $1n$ without being forwarded to the image processing unit $1c$ by determining if the stored sequence number SNm is stored in the sequence number storage unit $1m$. If the stored sequence number SNm is not stored in the sequence number storage unit $1m$ (No in ST12), it can be concluded that there is no image data DT still remaining in the data storage unit $1n$ before the program flow advances to step ST13. As frame 1 of FIG. 11 corresponds to the starting point of communication, and no image data DT has been received at this stage, it can be determined that there is no image data DT still remaining in the data storage unit $1n$, and the program flow advances to step ST13.

In step ST13, a positive response ACK(n) for the scheduled packet sequence number SNw is transmitted. In the case of frame 1 of FIG. 11, in the resend control signal transmission process, as the scheduled packet sequence number SNw is 0, a positive response ACK(0) is transmitted.

In step ST12 discussed above, if it is determined that the data storage unit $1n$ stores image data DT (Yes in ST12), the program flow advances to step ST14. In step ST14, as image data DT that is not processed is held in a queue of the data storage unit $1n$, a negative response NACK(n) for requesting a resending of a packet corresponding to the scheduled packet sequence number SNw of n as a resend control signal. Following step ST13 and step ST14, the program flow advances to step ST15.

The resend control unit which decides if a positive response ACK or a negative response NACK is to be transmitted, and performs other transmission control is provided in the control unit $1b$ which may be implemented by a computer operating under a computer program.

In step ST15, the scheduled packet sequence number SNw (=n) at the timing of transmitting a resend signal consisting of a positive response ACK(n) or a negative response NACK(n) is stored. The control flow of the resend control shown in FIG. 13 is executed in this manner.

Figure 14:
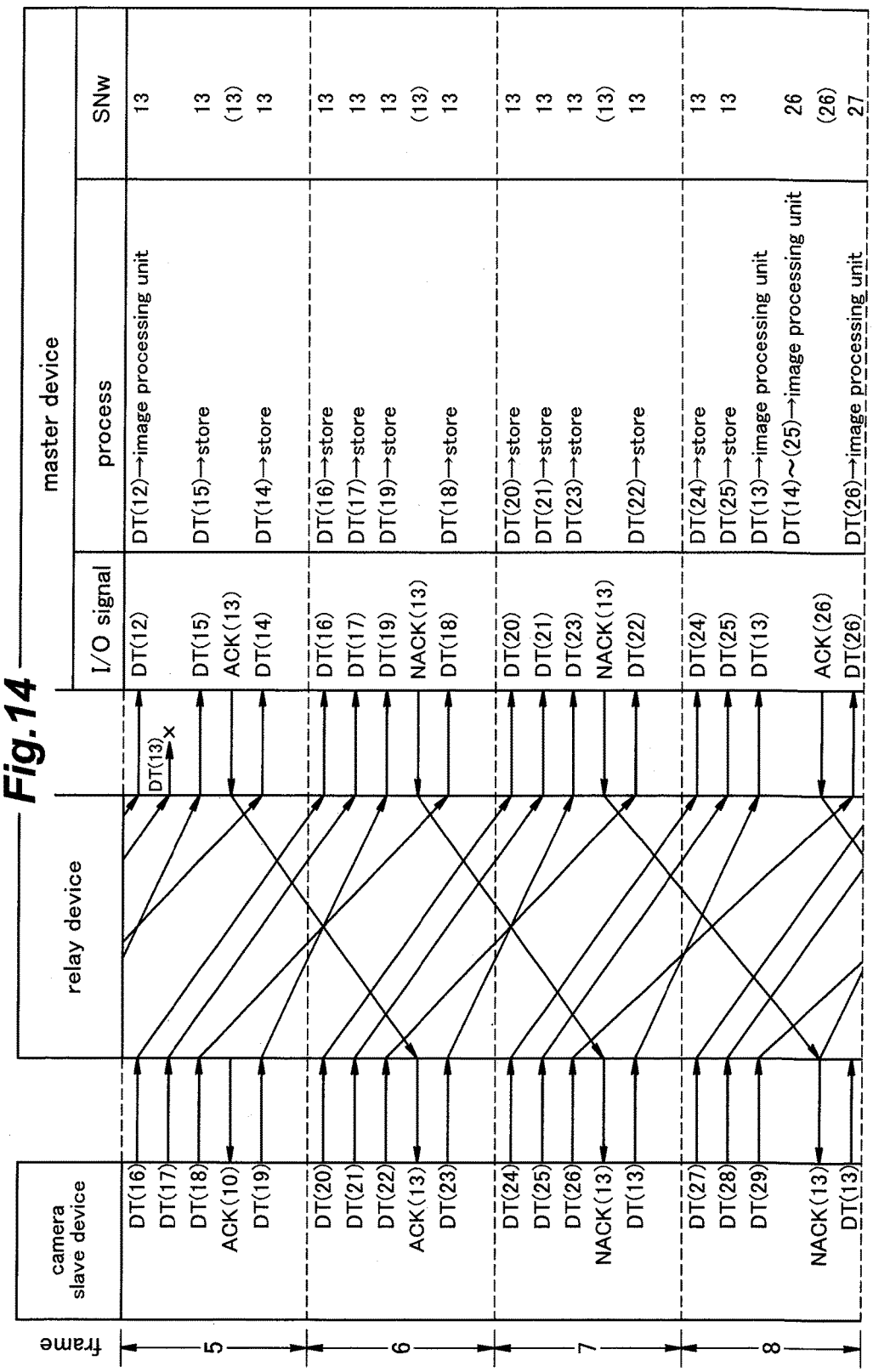
FIG. 14 is a view similar to FIG. 11 showing a case where a data reception error has occurred.

The mode of control based on the control flows shown in FIGS. 10 and 13 is described in the following with reference to the example shown in FIGS. 11 and 14.

The mode of operation in frame 1 of FIG. 11 was discussed earlier. The scheduled packet sequence number SNw is 0, and a positive response ACK(0) was transmitted in the transmission process for a resend control signal.

Upon moving to frame 2, image data DT(0) is received in the first packet process using a slot. In this case, the control flow of FIG. 10 is executed. As the sequence number of the received packet SNr (=0) is the same as the scheduled packet sequence number SNw (=0) in this case, the program flow advances from step ST1 to step ST2. The received image data DT(0) is forwarded to the image processing unit $1c$ in step ST2, and the scheduled packet sequence number SNw (or the sequence number of the packet that is expected to be received next in step ST3) is updated to 1.

As no image data DT is stored in the data storage unit $1n$ at this stage, it is determined that the scheduled packet sequence number SNw does not agree with the stored packet sequence number NSm in step ST4 so that the succeeding packet reception is executed.

In the illustrated embodiment, in frame 2, the image data DT(2) is not received, but the image data DT(3) is received. In this case, as the scheduled packet sequence number SNw is 2, the received packet sequence number SNr (=3) disagrees from the scheduled packet sequence number SNw so that the program flow advances from step ST1 to step ST5. As the received packet sequence number SNr is new, the program flow advances to step ST6 where the received image data DT(3) is stored in the data storage unit $1n$, and the stored packet sequence number SNm of 3 is stored in the sequence number storage unit $1m$.

Thereafter, the control flow for resend control signal transmission shown in FIG. 13 is executed. As the scheduled packet sequence number SNw is updated from 0 (at the time of previously transmitting the resend control signal) to 2, the program flow advances from step ST11 to step ST13. In step ST13, a positive response ACK(2) corresponding to the current scheduled packet sequence number SNw is transmitted. In the following step ST15, the value 2 of the scheduled packet sequence number SNw is stored.

In frame 2, the image data DT(2) is then received, and the control flow of FIG. 10 is executed. In step ST1 of this control flow, the received packet sequence number SNr and the scheduled packet sequence number SNw are both 2 and agree with each other so that the program flow advances to step ST2. The image data DT(2) is forwarded to the image processing unit 1c in step ST2, and the scheduled packet sequence number SNw is updated to 3 in step ST3. In step ST4, the received packet sequence number SNr and the scheduled packet sequence number SNw are both 3 and agree with each other so that the program flow advances to step ST8.

In step ST8, of the image data DT stored in the data storage unit 1n, the part corresponding to the stored packet sequence number SNm (=3) is forwarded to the image processing unit 1c. In the example of FIG. 11, the image data DT(3) is produced in frame 2. In the following step ST9, the scheduled packet sequence number SNw is updated to 4 before the program flow returns to step ST4. In step ST4, as there is no stored packet sequence number SNm that agrees with the scheduled packet sequence number SNw (=4), the control flow of FIG. 10 is concluded.

When the slot is changed to avoided interferences, instead of immediately transmitting a negative response NACK to request a resend as in the conventional transmission control for a resend control signal, the relay device 5 is allowed to receive a plurality of pieces of image data DT in a sequential manner, and continue the processing of the data. Therefore, as long as packets are received without omission, even when the order of the transmitted packets is sometimes reversed, the processing of data can be continued without transmitting a resend request, and a delay in the data processing can be avoided.

In frames 3 and 4 of FIG. 11, the relay device 5 continues the data reception and transmission by using the slot in frame 2 that was changed. The data DT(4)-DT(7) that was transmitted from the camera slave device 3 in frame 2 is received by the master device 1 in frame 3, and the data DT(8)-DT(11) that was transmitted from the camera slave device 3 in frame 3 is received by the master device 1 in frame 4. Besides from updating the sequence number SN in each case, the data processing is carried out in a same way.

In the following is described the mode of operation of the illustrated embodiment when a reception error has occurred in any of a plurality of pieces of image data DT with reference to FIG. 14 which is similar to FIG. 11 and is a continuation of FIG. 11. The description on the part of the data reception and transmission in frames 5-8 in FIG. 14 which is similar to a corresponding part of FIG. 11 is omitted from the following description.

In frame 5, the data DT(12)-DT(15) that was transmitted from the camera slave device 3 in frame 4 is transmitted to the master device 1 via the relay device 5. Suppose that a reception error occurred to data DT(13), and the master device 1 was unable to receive this piece of image data. Please note that the order of the image data DT(15) and the image data DT(14) is reversed owing to the changing of the slot as a measure against interferences shown in FIG. 11.

In this case, when the image data DT(15) has been correctly received, the scheduled packet sequence number SNw is 13 whereas the received packet sequence number SNr is 15, and there is a disagreement (No in ST1). Therefore, in the control flow of FIG. 10, the program flow advances from step ST1 to step ST5. In step ST5, as the received packet sequence number SNr (=15) is new (Yes in ST5), the program flow advances from step ST5 to step ST6 to store the image data DT(15) in the data storage unit 1n and store the updated stored packet sequence number SNm (=15) in the sequence number storage unit 1m.

Thereafter, the control flow for resend control signal transmission shown in FIG. 13 is executed. In step ST11, as the scheduled packet sequence number SNw is updated to 13 after receiving the image data DT(12) in frame 5 whereas the scheduled packet sequence number SNw at the time of previously transmitting the resend control signal was 10 in frame 4 (Yes in step ST11), the program advances to step ST13. The master device 1 transmits a positive response ACK(13) in step ST13, and the scheduled packet sequence number SNw (=13) at the time of transmitting the resend control signal is stored in step ST15.

At the end of frame 5, the image data DT(14) is received. In this case, the scheduled packet sequence number SNw is 13 whereas the received packet sequence number SNr is 14 so that the program flow advances from step ST1 to step ST5. As the received packet sequence number SNr (=14) is new, the program flow advances to step ST6 to store the image data DT(14) in the data storage unit 1n.

In frame 6, the image data DT(16), DT(17), DT(19) is received in that order. Also in the control flow of the reception process shown in FIG. 10, the program flow advances from step ST1 to steps ST5 and ST6 to store the corresponding image data in the data storage unit 1n, similarly as in the case of the image data DT(15), and store the corresponding stored packet sequence numbers SNm in the sequence number storage unit 1m as 16, 17 and 19.

When storing these stored packet sequence numbers SNm, as the scheduled packet sequence number SNw (=13) at the time of previously transmitting the resend control signal is not updated, in the control flow of the transmission process for the master device 1 shown in FIG. 13, the program flow advances from step ST11 to ST12. In step ST12, it is determined that the sequence number storage unit 1m already contains the stored packet sequence numbers SNm so that the program flow advances to step ST14 where a negative response NACK(13) is transmitted from the master device 1. In the following step ST15, the scheduled packet sequence number SNw (=13) at the time of transmission is stored.

In frame 6, following the transmission of the negative response NACK(13), the master device 1 receives the image data DT(18). In this case, the scheduled packet sequence number SNw remains to be 13. As the scheduled packet sequence number SNw (=13) is not updated, the master device 1 transmits the negative response NACK(13) once again in the following frame 7.

In frame 7, the camera slave device 3 receives the negative response NACK(13) which was transmitted from the master device 1 in frame 6 and relayed by the relay device 5, and as a response, transmits the image data DT(13) selected from the image data stored in the buffer unit 3n by using the slot following the slot for receiving the negative response NACK(13). The image data DT(24), DT(25), DT(26) was transmitted from the camera slave device 3 by using the three slots preceding the slot used for receiving the negative response NACK(13).

In frame 7, as the master device 1 has not received the image data DT(13), similarly as in the process for frame 6, the master device 1 receives the image data DT(20), DT(21), DT(23) in that order, and stores it in the data storage unit 1*n* similarly as in step ST6 for frame 6 while the stored packet sequence numbers SNm (=20, 21, 23) corresponding to this image data are stored in the sequence number storage unit 1*m*. The master device 1 also receives the image data DT(22) via the slot immediately following that used for transmitting the negative response NACK, and stores this data in the data storage unit 1*n* while the corresponding stored packet sequence number SNm(=22) is stored in the sequence number storage unit 1*m*.

In frame 8, the master device 1 receives the image data DT(24), DT(25) in that order, and then receives the image data DT(13). The reception process at this time is described in the following with reference to the control flow shown in FIG. 10.

As the received packet sequence number SNr is 13, and the scheduled packet sequence number SNw is 13, the program flow advances from step ST1 to step ST2 where the image data DT(13) is forwarded to the image processing unit 1*c*. In the following step ST3, the scheduled packet sequence number SNw is updated to 14 before the program flow advances to step ST4. At this time, as the sequence number storage unit 1*m* stores the stored packet sequence numbers SNm (=14-25) and the data storage unit 1*n* stores the corresponding image data DT(14)-DT(25) as a result of the data storage processes for frame 5 onward. Therefore, in step ST4 shown in FIG. 10, it is determined that the stored packet sequence numbers SNm (=14-25) contain a number coinciding with the scheduled packet sequence number SNw of 14 so that the program flow advances to step ST8.

In step ST8, the corresponding image data DT(14) is read out from the data storage unit 1*n*, and is forwarded to the image processing unit 1*c*. In the following step ST9, the scheduled packet sequence number SNw is updated to 15 (=1+14) before the program flow returns to step ST4. In step ST4 also, as the updated scheduled packet sequence number SNw (=15) coincides with one of the stored sequence numbers SNm (=15), the program flow returns to step ST8 to read out the corresponding image data DT(15) form the data storage unit 1*n* and forward it to the image processing unit 4*c*.

In this manner, the steps ST4, ST8 and ST9 are repeated until the stored packet sequence number of 25 has come to be processed. As a result, before the missed piece of image data DT(13) is resent, other pieces of image data DT(14)-DT(25) are stored in the master device 1 instead of being discarded, and as soon as the image data DT(13) is resent, the image processing for the image data DT(13)-DT(25) is immediately performed in the master device 1 to resume the image processing that has been suspended owing to the error in the packet reception. At the same time, the scheduled packet sequence number SNw is updated, and the scheduled packet sequence number SNw becomes 26 upon completion of the processing of the image data DT(25).

Once the image data DT(25) is forwarded to the image processing unit 1*c* and the scheduled packet sequence number SNw is updated to 26, as there is no sequence number corresponding to this number stored in the sequence number storage unit 1*m*, a disagreement is detected in step ST4 so that the program flow of FIG. 10 is concluded.

In the succeeding control action of the transmission process shown in FIG. 13, it is determined in step ST11 that the scheduled packet sequence number SNw is updated from the previous value (Yes in ST11) so that the program flow advances to step ST13. In step ST13, a positive response ACK(26) is transmitted, and the scheduled packet sequence number SNw is updated to the current value in step ST15 before the program flow is concluded. Thereafter, the transmission processes shown in FIGS. 10 and 13 are performed.

The mode of wireless communication control in the wireless communication system of the illustrated embodiment is described in the following. The image data captured by each camera slave device 3 is transmitted to the master device 1, and this image data is transmitted to the monitor slave devices 4.

In this wireless communication system, the camera unit 3*h* starts acquiring an image as soon as the detecting unit 3*l* provided on the camera slave device 3 has detected an object. The acquired image is transmitted to the master device 1 and the monitor slave devices 4 (camera image transmission). Upon being notified of a camera image transmission from the camera slave device 3, the master device 1 emits a sound indicator from the speaker, and starts the reception of the acquired image by activating the wireless link for data communication with the camera slave device 3.

In the master device 1, the packets for the image data transmitted from the camera slave device 3 are stored in the data storage unit 1*n*, and while storing the sequence numbers of the received packets in the sequence number storage unit 1*m*, transmits a positive response ACK to the camera slave device 3 as a resend control signal if no problem such as a packet error has occurred.

If necessary, such as when a packet error or a packet loss has occurred, a negative response NACK is transmitted to the camera slave device 3 as a resend signal. The master device 1 reconstructs the image from the image data transmitted from the camera slave device 3, and displays the image on the LCD of the display unit 1*h*. If necessary, the reconstructed image is transmitted to the monitor slave device 4.

Upon receiving a negative response NACK from the master device 1, the camera slave device 3 looks for the packet corresponding to the sequence number indicated by the negative response NACK in the buffer, and if the packet is indeed found in the buffer, retransmits the packet corresponding to the sequence number indicated by the negative response NACK.

The master device 1 notifies the camera image transmission to the monitor slave device 4 via a control signal, along with the transmission slot for transmitting the camera image to the monitor slave device 4 and the reception slot for receiving the signals for various control actions from the monitor slave device 4. For example, the signal concerning the resending of image data (resend control signal) is transmitted from the monitor slave device 4 to the master device 1 via this reception slot.

The master device 1 forwards the image data that has been received from the camera slave device 3 (reconstructed image) or from the door phone slave device 2 to the monitor slave device 4 when applicable. In transmitting the image data to the monitor slave device 4, the image data is split into packets suitable for transmission to the slave device, and so that the packets are stored in the buffer unit 1*o* in a sequential manner, and transmits via the slots for the camera image transmission indicated in the control signal again in a sequential manner.

The master device 1 does not immediately discard the data that corresponds to the packet that has been transmitted, but keeps it as long as possible so that the data may be resent to the monitor slave device 4 when required. The master device 1 is configured such that when the buffer unit 1*o* becomes full, the oldest packets are discarded from the buffer unit 1*o*. When a negative response NACK is received from the monitor slave device 4, the buffer unit 1o is searched, and if the packet corresponding to the sequence number indicated in the negative response NACK is found in the buffer unit 1o, the packet corresponding to the sequence number indicated in the negative response NACK is transmitted.

The mode of operation of the monitor slave device 4 when receiving a camera image transmission is now described in the following. Once the arrival of a camera image transmission is notified via the control channel, the monitor slave device 4 starts receiving the signal via the slots for transmitting camera image, and temporarily stores the packets of the image data transmitted from the master device 1 in the data storage unit 4n. At the same time, the monitor slave device 4 stores the sequence numbers of the received packets in the sequence number storage unit 4m, and reconstructs the image by reading out the image data stored in the data storage unit 4n before displaying the reconstructed image on the LCD of the display unit 4h.

While storing the packet data in the data storage unit 4n, if a need arises, the monitor slave device 4 transmits a negative response NACK to the master device 1 to request the failed packet to be resent.

Each monitor slave device 4 in the system operates in a similar fashion so that the monitor slave devices 4 simultaneously receive the image data transmitted from the master device 1, and the image captured by the camera slave device 3 is displayed on the LCD of the display units 4h of all of the monitor slave devices 4. Each monitor slave device 4 individually detects an error in each packet as will be described hereinafter, and upon detecting an error, transmits a negative response NACK to the master device 1.

At this time, the master device 1 transmits a frame number which is incremented by each frame, along with the control signal, and each slave device that has received this control signal determines a transmission timing (frame number) for transmitting a control signal (such as a resend control signal including a negative response NACK, for instance) according to a predetermined procedure. It is also possible to have each slave device determine the timing for transmitting the signal for various control purposes in a distinct manner (for instance, by varying the frame number of the frame in which the negative response NACK is transmitted) so that the collision of timing for transmitting negative responses NACK may be avoided.

For instance, in a case where there are two monitor slave devices 4 in the system, one of the monitor devices may transmit a negative response NACK only in even frame numbers while the other monitor device transmits a negative response NACK only in odd frame numbers so that the collision of timing for transmitting negative responses NACK may be avoided.

Also, each monitor slave device 4 may start a resend control for packets by using the frame number of the first packet which was received when the reception of the image data packets was first started as an initial value. For instance, when a monitor slave device 4 which was outside the transmission range of the master device 1 has moved into the range of the master device 1 during the process of transmitting a camera image, the monitor slave device 4 receives only the later part of the camera image packets. In such a case, by using the sequence number of the packet that was received first as the initial value of the scheduled packet sequence SNw (which will be described hereinafter), the monitor slave device 4 is enabled to start the reception of the image data from a middle point thereof.

The mode of operation of the relay device 5 when relaying a wireless communication between the master device 1 and one of the monitor slave devices 4 is described in the following. Upon being notified of a camera image transmission via the control channel, the communication slots for communicating camera image data and resend requests between the monitor slave device 4 and the relay device 5 are determined. At the same time, via a control signal, the monitor slave device 4 is notified of a camera image transmission, along with the transmission slot for the camera image and the reception slot for a resend request.

The relay device 5 temporarily stores the camera image data received from the master device 1 in the buffer unit 5n, and transmits it to the monitor slave device 4 in the following frame. The various signals that are transmitted from the monitor slave device 4 are also transmitted to the master device 1 via the relay device 1. For instance, when sending a resend control signal related to the image data from the monitor slave device 4 to the master device 1, the relay device 5 temporarily stores the resend request received from the monitor slave device 4 in the buffer unit 5n, and transmits it to the master device 1 in the following frame.

Figure 15:
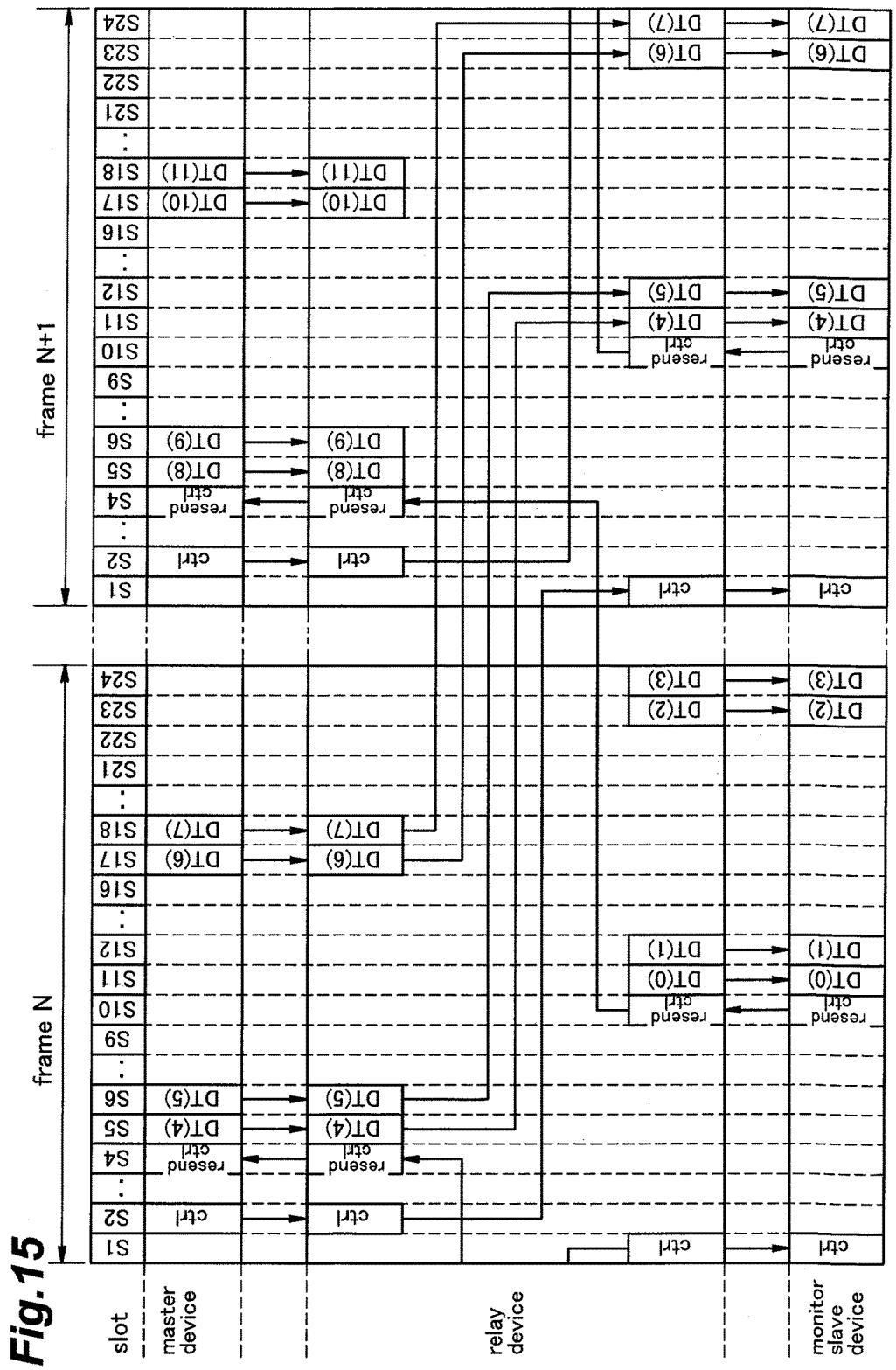
FIG. 15 is a diagram showing a mode of communication between the master device and the monitor slave device via the relay device.

FIG. 15 shows the mode of operation of the communication between the master device 1 and the monitor slave device 4 via the relay device 5 when image data is being transmitted from any one of the door phone slave device 2 and the camera slave devices 3. In FIG. 15, in frame N, the relay device 5 receives the packets transmitted from the master device 1 in the order of the corresponding packet sequence numbers SN, and temporarily stores them in the buffer unit 5n. The relay device 5 then transmits the corresponding packet data to the monitor slave device 4 in the following frame N+1. In the example illustrated in FIG. 15, the image data is transmitted from the master device 1 via four slots.

The various signals are transmitted from the monitor slave device 4 to the master device 1 via a single slot (or slot S10) in the illustrated embodiment. The relay device 5 temporarily stores various signals received from the monitor slave device 4 in the buffer unit 5n, and transmits it to the master device 1 in the following frame N+1.

As for the resend control signal transmitted from the monitor slave device 4 to the master device 1, the monitor slave device 4 transmits a resend request signal via a single slot, and the relay device 5, after storing it in the buffer unit 1n, transmits it to the master device 1 via the following frame N+1.

When receiving image data, the master device 1 notifies the event to the slave device as a part of the control signal, and notifies the slave device of the slot for transmitting the image data and the slot for receiving a resend request.

Upon being notified of the start of receiving image data via the control signal received from the master device 1, the relay device 5 changes the operation mode thereof to that for relaying image data and resend requests. In other words, the relay device 5 notifies the monitor slave device 4 on the receiving end that the control signal is being received. At the same time, the relay device 5 notifies the monitor slave device 4 of the slot for transmitting the image data and the slot for receiving resend requests.

In the example illustrated in FIG. 15, in frame N, the relay device 5 uses slots S1, S10, S11, S12, S22, S23 and S24 for exchanging packets with the monitor slave device 4, and slots S2, S4, S5, S6, S16, S17 and S18 for exchanging packets with the master device 1.

More specifically, the relay device 5 receives a control signal transmitted from the master device 1 via slot S2, and transmits a control signal to the monitor slave device 4 via slot S1. The relay device 5 further receives a resend control signal transmitted from the monitor slave device 4 via slot S10, and transmits it to the master device 1 via slot S4 of the succeeding frame.

Also, the relay device 5 transmits the packets transmitted from the master device 1 earlier and stored in the buffer unit 5*n* to the monitor slave device 4 via slots S11, S12, S22, S23 and S24. In FIG. 15, the packets that are transmitted to the monitor slave device 4 are represented by the image data DT(0), DT(1), DT(2) and DT(3) contained therein. The same is true in the following description.

The relay device 5 receives the succeeding image data DT(4), DT(5), DT(6) and DT(7) (packets) transmitted from the master device 1 via slots S5, S6, S17 and S18, and transmits this image data to the monitor slave device 4 in the following frame.

In FIG. 15, the monitor slave device 4 transmits a resend control signal via slot S10, and the relay device 5 transmits the received resend control signal to the master device 1 via slot 4 of the succeeding frame. When the communication is performed in a proper manner, a positive response ACK is transmitted to the master device 1 as a resend control signal. If any problem such as a loss of a packet has occurred, a negative response NACK is transmitted to the master device 1 as a resend control signal.

It is also possible to do away with the transmission of a positive response ACK or to omit the resend control signal altogether when the communication is performed in a proper manner. In other words, as will be described hereinafter, when the communication is performed in a proper manner, the monitor slave device 4 may not transmit a resend control signal via slot S10, and the relay device 5 may not transmit any signal via slot S4 in the succeeding frame.

When there are no external interferences in the slots that are used, as shown in FIG. 15, following frame N, the exchange of signals is continued in frame N+1 in a similar fashion. Thus, as a wireless communication is performed between the master device 1 and the monitor slave device 4 via the relay device 5, the relay device 5 temporarily stores the received data in the buffer unit 5*n*, and transmits it in the succeeding frame.

As the volume of image data required for each frame of image is significant, the transmission of image data is performed by using a plurality of slots as discussed above. In the illustrated embodiment, four slots are used for each image frame. The receiving end (monitor slave device 4) processes the image data in the order of the sequence numbers SN assigned to the corresponding packets. In the illustrated embodiment, the four pieces of image data (transmitted via the corresponding slots) form a single image frame. In the relay device 5, a slot under interferences may be substituted by another, and this prevents the sequence numbers SN from the relay device 5 to the monitor slave device 4 to be consecutive. According to the present invention, a certain control action is taken by the monitor slave device 4 in such a situation as will be discussed hereinafter.

The control process is carried out in a similar fashion as that for the reception control in the master device 1 which was described with reference to FIG. 10, and the control process for the reception control process in the monitor slave device 4 is described in the following with reference to the same drawing or FIG. 10.

This control action is mainly performed by the control unit 4*b* which may be implemented by a computer operating under a computer program. This reception control process is executed immediately following the completion of a communication process via each of the slot S11, S12, S23 and S24 of each frame when the packets are normally received.

Figure 16:
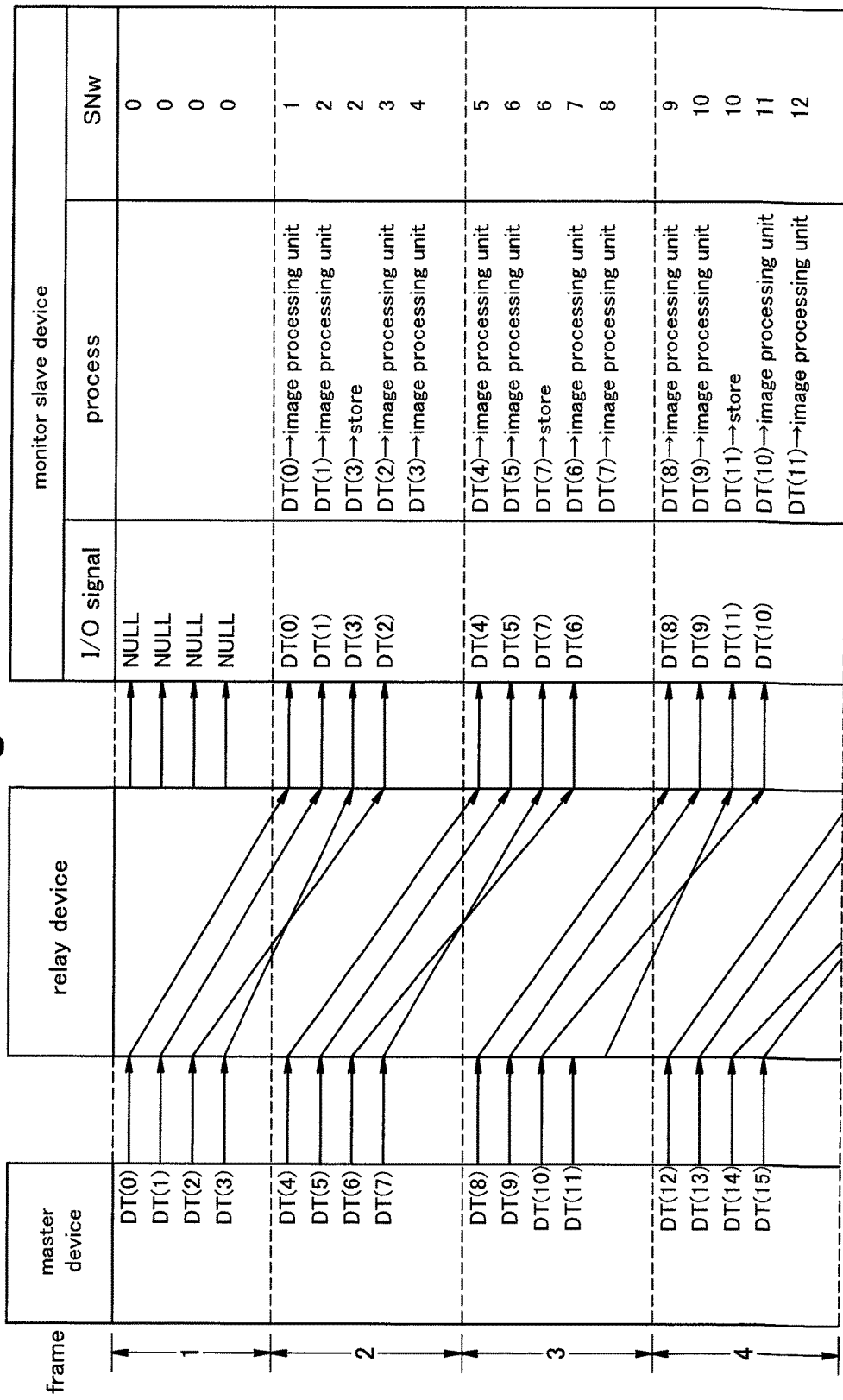
FIG. 16 shows a mode of transmission and reception control between the monitor slave device and the master device via the relay device.
Figure 18:
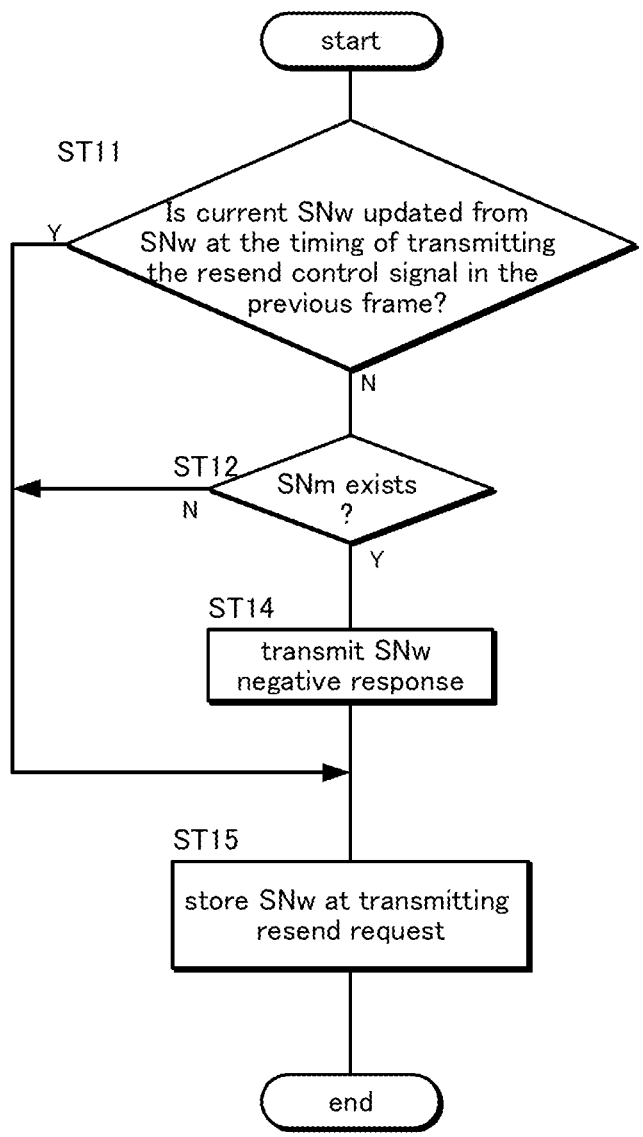
FIG. 18 is a flowchart of transmission control for a resend control signal at the monitor slave device.

FIG. 16 shows a mode of transmission and reception control between the monitor slave device 4 and the master device 1 via the relay device 5. In FIG. 16, the vertical axis consists of a time axis that progresses from top to bottom, and image data DT is transmitted from the master device 1 in frame 1. The reception signal from the relay device 5 (indicated by the rightward arrow in FIG. 11) is processed as shown in the flowchart of FIG. 10, and the transmission signal from the monitor slave device 4 to the relay device 5 (indicated by the leftward arrow in FIG. 11) is processed as shown in the flowchart of FIG. 18 which will be described hereinafter.

In the reception process in step ST1 of FIG. 10, it is determined if the sequence number SNr of the packet that has been received coincides with the scheduled packet sequence number SNw. This determination process is carried out by comparing the scheduled packet sequence number SNw (stored in the sequence number storage unit 4*m* or any other suitable rewritable storage unit) and the sequence number SNr of the packet that has been received in the control unit 4*b* (serving as a resend control unit). In FIG. 10, SNw indicates the scheduled sequence packet number, and SNm indicates the stored sequence packet number stored in the sequence number storage unit 4*m*. SNr indicates the sequence number of the currently received packet that has been correctly received.

As shown in frame 1 of FIG. 16, the four pieces of image data DT(0) to DT(3) forming a single image frame are transmitted from the master device 1 in that order, and are received by the relay device 5. The numbers in the brackets indicate the sequence numbers n=0, 1, 2, . . . of the packets, and are updated in the master device 1 in the ascending order. For instance, the image data DT(0) corresponds to the packet given with a sequence number SN of 0.

In frame 1 of FIG. 16, as it is the first frame, the relay device 5 possesses no received image data DT. In such a case, relay device 5 transmits a "no signal" signal (NULL) to the monitor slave device 4 via the same slot. As the monitor slave device 4 possesses no image data DT, the scheduled packet sequence number SNw is 0 as it corresponds to the first image data piece DT(0) to be received.

In the example illustrated in FIG. 16, as can be seen in frames 1 and 2, in the processing operation within the relay device 5, following the image data DT(0) and DT(1), instead of the image data DT(2), the relay device 5 transmits the image data DT(3), and only upon receiving a resend control signal from the monitor slave device 4, transmits the image data DT(2).

The relay device 5 is configured to handle the slots in a flexible manner so that if any slot is under external interferences, other unaffected slots may be selected. A more specific example is described in the following with reference to FIG. 17 which corresponds to the example given in FIG. 15.

Figure 17:
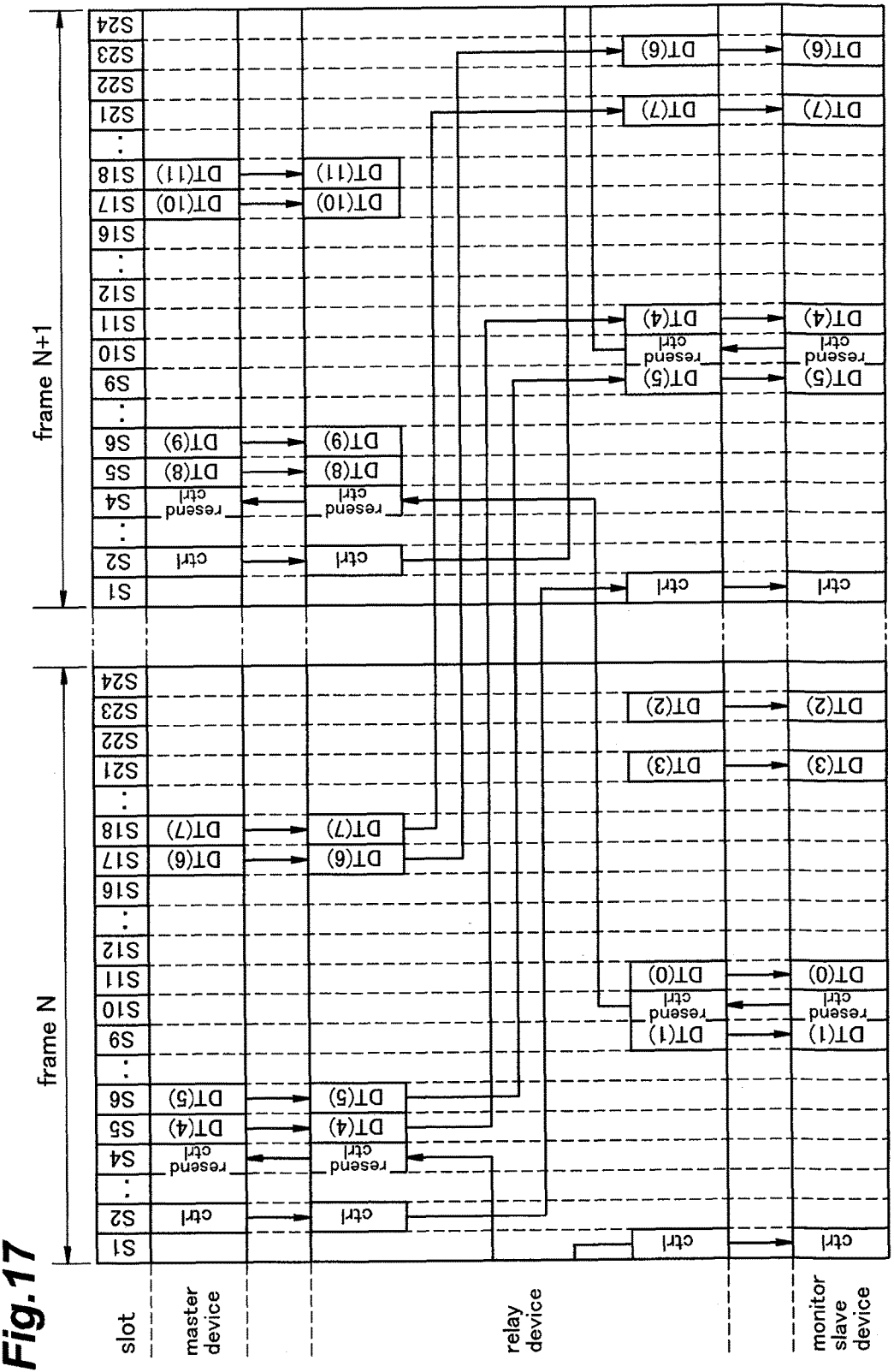
FIG. 17 is a view similar to FIG. 15 showing a case where the time order of some of the data reception is reversed at the monitor slave device.

In frame number N+1 in FIG. 17, in order to avoid the influences of interferences, the slots for transmitting image data DT(5) and DT(7) from the relay device 5 to the monitor slave device 4 are changed from slot S12 in FIG. 15 to slot S9, and from slot S24 in FIG. 15 to slot S21. Thus, the image data DT(4) and DT(5) received from the master device 1 in frame number N is transmitted to the monitor slave device 4 via different slots. More specifically, in the example illustrated in FIG. 17, whereas the image data DT(4) and DT(5) was received from the master device 1 via slots S9 and S6, respectively, in frame number N, the image DT(4)

is transmitted to the master device 1 via slot S11, and the image data DT(5) is transmitted to the master device 1 via slot S9, in the succeeding frame number N+1.

Similarly, of the image data DT(6) and DT(7) which was received by the relay device 5 in frame number N, the image data DT(6) is transmitted to the monitor slave device 4 via slot S23 and the image data DT(7) is transmitted to the monitor slave device 4 via slot S21, in the succeeding frame number N+1. The changes in the slots (channels) can be made as required when any intended slots are interfered, and the selection of the slots can be made freely. As a result of such changes in the slots, the sequence of packet transmission could be reversed as happened in the illustrated example.

In FIG. 17, the monitor slave device 4 transmits a resend control signal to the relay device 5 via slot S10, and the relay device 5 transmits the received resend control signal to the master device 1 via slot S4 in the succeeding frame. When the communication is performed in a proper manner, a positive response ACK is transmitted to the master device 1 as a resend control signal. If any problem such as a loss of a packet has occurred, a negative response NACK is transmitted to the master device 1 as a resend control signal.

It is also possible to do away with the transmission of a positive response ACK or to omit the resend control signal altogether when the communication is performed in a proper manner. In the examples illustrated in FIGS. 16 and 19, the monitor slave device 4 does not transmit a positive response ACK when no reception error has occurred.

When neither a positive response ACK nor a negative response NACK is required to be transmitted, the monitor slave device 4 may not transmit any resend control signal. In such a case, the relay device 5 transmits nothing via slot S4 in the succeeding frame.

Referring to FIG. 10, if the sequence number SNr of the packet that has been received is determined to coincide with the scheduled packet sequence number SNw in step ST1 of FIG. 10 (ST1: Yes), the image data DT of the received packet is forwarded to the image processing unit 4c in step ST2.

In the image processing unit 4c of the monitor slave device 4, until a plurality of (four, in the illustrated embodiment) pieces of image data DT(n) to DT(n+3) that are required to reconstruct a frame of image have been received, the process to read out data from the data storage unit 4n and forward the data to the display unit 4h is suspended. Once the reception of the pieces of image data DT(n) to DT(n+3) that are required to reconstruct a frame of image is confirmed, the corresponding image data DT(n) to DT(n+3) is forwarded to the display unit 4h. The display unit 4h combines the pieces of data DT(n) to DT(n+3) to display the combined image on the monitor screen.

In the following step ST3, the scheduled packet sequence number SNw is updated to that of the packet to be received next (n←n+1) before advancing to step ST4. In step ST4, it is determined if the scheduled packet sequence number SNw is the same as the stored sequence number NSm stored in the number storage unit 4m. If it is determined that the scheduled packet sequence number SNw cannot be found in the stored sequence numbers SNm in step ST4, the current routine is concluded. In the initial state, the scheduled packet sequence number SNw is "0".

If the sequence number SNr of the packet for the image data DT which has been received does not agree with the scheduled packet sequence number SNw (No in step ST1), the program flow advances to step ST5.

In step ST5, it is determined if the sequence number SNr of the packet that has been received is new or, in other words, it is determined if a packet having a same sequence number as the packet that has just been normally received was received in the past. If the sequence number SNr of the packet that has been received is new or the sequence number SNr of the packet that has been received is greater than the scheduled packet sequence number SNw (Snr>SNw) (Yes in step ST5), the program flow advances to step ST6.

If the sequence number SNr of the packet that has been received is new, the data contained in the packet given with this sequence number SNr is stored in the data storage unit 4n and the corresponding sequence number SNr is stored as the stored sequence number SNm (SNr=SNm).

If the sequence number SNr of the packet that has been received is not new in step ST5 (No in step ST5), the program flow advances to step ST7. Because the packet of this sequence number SNr is already processed, the redundant packet of this sequence number is discarded to avoid any unnecessary use of resources.

If it is determined in step ST4 that the stored sequence numbers SNm include a sequence number that agrees with the scheduled packet sequence number SNw, the program flow advances to step ST8. In this case, in the example of FIG. 16, a reception process for frame number 2 or any subsequent frame number is executed.

In step ST8, the packet whose sequence number SNr coincides with a stored sequence number SNm (=n) is taken out from the data storage unit 4n, and the image data DT(n) contained in the packet is forwarded to the image processing unit 4c. The sequence number of the packet that has been taken out is deleted from the stored sequence numbers SNm.

In the following step ST9, the scheduled packet sequence number SNw is updated (n←n+1) similarly as in step ST3, and the program flow returns to step ST4. In this case, steps ST8 and ST9 are repeated until the stored data in the data storage unit 4n corresponding to the scheduled packet sequence number SNw is exhausted in step ST4.

Upon completion of steps ST6 and ST7 or when the stored sequence number SNm stored in the sequence number storage unit 1m does not agree with the scheduled packet sequence number SNm in step ST4, the control flow of the packet reception in FIG. 10 is concluded. Therefore, even when there is no agreement between SNm and SNw (No in step ST4) or there is any loss or delay (reversed order) in the received packets, the negative response NACK(n) is not immediately transmitted.

FIG. 18 is a flowchart of the control process which is executed when transmitting various control signals from each monitor slave device 4 to the master device 1 to determine if a negative response NACK(n) is to be transmitted as a resend signal. In this case also, the control process is performed primarily by the control unit 4b which may be implemented by a computer operating under a computer program. This transmission process for a resend control signal (response signal) is performed via (a front end of) a slot (slot S10 in FIG. 15) in each frame allocated for the monitor slave device 4 to transmit such a signal.

In the control flow of the transmission process of FIG. 18, in step ST11, it is determined if the scheduled packet sequence number SNw (the scheduled packet sequence number SNw which was previously stored in step ST15 which will be described hereinafter) at the timing of transmitting a control signal from the monitor slave device 4 to the master device 1 in the previous control cycle (the previous frame) agrees with the latest value of the current scheduled packet sequence number SNw. If it is determined that the scheduled packet sequence number SNw was not updated in step ST11 (No in ST11), the program flow advances to step ST12.

In step ST12, it is determined if there is any image data DT still remaining in the data storage unit 4n without being forwarded to the image processing unit 4c by determining if the stored sequence number SNm is stored in the sequence number storage unit 4m. If the stored sequence number SNm is not stored in the sequence number storage unit 4m (No in ST12), it can be concluded that there is no image data DT still remaining in the data storage unit 4n before the program flow advances to step ST15. As frame 1 of FIG. 16 corresponds to the starting point of communication, and no image data DT has been received at this stage, it can be determined that there is no image data DT still remaining in the data storage unit 4n, and the program flow advances to step ST15.

In step ST12 discussed above, if it is determined that the data storage unit 4n stores image data DT (Yes in ST12), the program flow advances to step ST14. In step ST14, as image data DT that is not processed is held in a queue of the data storage unit 4n, a negative response NACK(n) for requesting a resending of a packet corresponding to the scheduled packet sequence number SNw of n is transmitted as a resend control signal. Following step ST14, the program flow advances to step ST15.

The resend control unit which decides if a negative response NACK is to be transmitted, and performs other transmission control is provided in the control unit 4b which may be implemented by a computer operating under a computer program.

In step ST15, the scheduled packet sequence number SNw (=n) at the timing of transmitting a resend signal is stored. In other words, in step ST15, the scheduled packet sequence number SNw is updated at the timing of transmitting a signal from the monitor slave device 4 to the master device 1. If a negative response NACK is transmitted in step ST14 as a resend signal, the scheduled packet sequence number SNw coincides with the sequence number of the packet which has been requested to be resent. The control flow of the resend control shown in FIG. 18 is executed in this manner.

The mode of control based on the control flows shown in FIGS. 10 and 18 is described in the following with reference to the example shown in FIGS. 16 and 19.

The mode of operation in frame 1 of FIG. 16 was discussed earlier. The scheduled packet sequence number SNw is 0, and nothing is transmitted in the transmission process for a resend control signal.

Upon moving to frame 2, image data DT(0) is received in the first packet process using a slot. In this case, the control flow of FIG. 10 is executed. As the sequence number of the received packet SNr (=0) is the same as the scheduled packet sequence number SNw (=0) in this case, the program flow advances from step ST1 to step ST2. The received image data DT(0) is forwarded to the image processing unit 4c in step ST2, and the scheduled packet sequence number SNw (or the sequence number of the packet that is expected to be received next in step ST3) is updated to 1.

As no image data DT is stored in the data storage unit 4n at this stage, it is determined that the scheduled packet sequence number SNw does not agree with the stored packet sequence number NSm in step ST4 so that the succeeding packet reception is executed.

In the illustrated embodiment, in frame 2, the image data DT(2) is not received, but the image data DT(3) is received. In this case, as the scheduled packet sequence number SNw is 2, the received packet sequence number SNr (=3) disagrees from the scheduled packet sequence number SNw so that the program flow advances from step ST1 to step ST5. As the received packet sequence number SNr is new, the program flow advances to step ST6 where the received image data DT(3) is stored in the data storage unit 4n, and the stored packet sequence number SNm of 3 is stored in the sequence number storage unit 4m.

Thereafter, the control flow for resend control signal transmission shown in FIG. 18 is executed. As the scheduled packet sequence number SNw is updated from 0 (at the time of previously transmitting the resend control signal) to 2, the program flow advances from step ST11 to step ST15. In step ST15, the value 2 of the scheduled packet sequence number SNw is stored.

In frame 2, the image data DT(2) is then received, and the control flow of FIG. 10 is executed. In step ST1 of this control flow, the received packet sequence number SNr and the scheduled packet sequence number SNw are both 2 and agree with each other so that the program flow advances to step ST2. The image data DT(2) is forwarded to the image processing unit 4c in step ST2, and the scheduled packet sequence number SNw is updated to 3 in step ST3. In step ST4, the received packet sequence number SNr and the scheduled packet sequence number SNw are both 3 and agree with each other so that the program flow advances to step ST8.

In step ST8, of the image data DT stored in the data storage unit 4n, the part corresponding to the stored packet sequence number SNm (=3) is forwarded to the image processing unit 4c. In the example of FIG. 16, the image data DT(3) is produced in frame 2. In the following step ST9, the scheduled packet sequence number SNw is updated to 4 before the program flow returns to step ST4. In step ST4, as there is no stored packet sequence number SNm that agrees with the scheduled packet sequence number SNw (=4), the control flow of FIG. 10 is concluded.

When the slot is changed to avoided interferences, instead of immediately transmitting a negative response NACK to request a resend as in the conventional transmission control for a resend control signal, the monitor slave device 4 is allowed to receive a plurality of pieces of image data DT in a sequential manner, and continue the processing of the data. Therefore, as long as packets are received without omission, even when the order of the transmitted packets is sometimes reversed, the processing of data can be continued without transmitting a resend request, and a delay in the data processing can be avoided.

In frames 3 and 4 of FIG. 16, the relay device 5 continues the data reception and transmission by using the slot in frame 2 that was changed. The data DT(4)-DT(7) that was transmitted from the master device 1 in frame 2 is received by the monitor slave device 4 in frame 3, and the data DT(8)-DT(11) that was transmitted from the master device 1 in frame 3 is received by the monitor slave device 4 in frame 4. Besides from updating the sequence number SN in each case, the data processing is carried out in a same way.

In the following is described the mode of operation of the illustrated embodiment when a reception error has occurred in any of a plurality of pieces of image data DT during the process of transmitting the image data DT originally transmitted from the master device 1 to the monitor slave device 4 via the relay device 5 with reference to FIG. 19 which is similar to FIG. 16 and is a continuation of FIG. 16. The description on the part of the data reception and transmission in frames 5-8 in FIG. 19 which is similar to a corresponding part of FIG. 16 is omitted from the following description.

Referring to FIG. 19, in frame 5, the data DT(12)-DT(15) that was transmitted from the master device 1 in frame 4 (as shown in FIG. 16) is transmitted to the monitor slave device 4 via the relay device 5. Suppose that a reception error occurred to data DT(13), and the monitor slave device 4 was unable to receive this piece of image data. Please note that the order of the image data DT(15) and the image data DT(14) is reversed owing to the changing of the slot as a measure against interferences shown in FIG. 16.

In this case, when the image data DT(15) has been correctly received, the scheduled packet sequence number SNw is 13 whereas the received packet sequence number SNr is 15, and there is a disagreement (No in ST1). Therefore, in the control flow of FIG. 10, the program flow advances from step ST1 to step ST5. In step ST5, as the received packet sequence number SNr (=15) is new (Yes in ST5), the program flow advances from step ST5 to step ST6 to store the image data DT(15) in the data storage unit 4n and store the updated stored packet sequence number SNm (=15) in the sequence number storage unit 4m.

Thereafter, the control flow for resend control signal transmission shown in FIG. 18 is executed. In step ST11, as the scheduled packet sequence number SNw is updated to 13 after receiving the image data DT(12) in frame 5 whereas the scheduled packet sequence number SNw at the time of previously transmitting the resend control signal was 10 in frame 4 (Yes in step ST11), the program advances to step ST15. In step ST15, the scheduled packet sequence number SNw (=13) at the time of transmitting the resend control signal is stored.

At the end of frame 5, the image data DT(14) is received. In this case, the scheduled packet sequence number SNw is 13 whereas the received packet sequence number SNr is 14 so that the program flow advances from step ST1 to step ST5. As the received packet sequence number SNr (=14) is new, the program flow advances to step ST6 to store the image data DT(14) in the data storage unit 4n.

In frame 6, the image data DT(16), DT(17), DT(19) is received in that order. Also in the control flow of the reception process shown in FIG. 10, the program flow advances from step ST1 to steps ST5 and ST6 to store the corresponding image data in the data storage unit 4n, similarly as in the case of the image data DT(15), and store the corresponding stored packet sequence numbers SNm in the sequence number storage unit 4m as 16, 17 and 19.

When storing these stored packet sequence numbers SNm, as the scheduled packet sequence number SNw (=13) at the time of previously transmitting the resend control signal is not updated, in the control flow of the transmission process for the monitor slave device 4 shown in FIG. 18, the program flow advances from step ST11 to ST12. In step ST12, it is determined that the sequence number storage unit 4m already contains the stored packet sequence number SNms so that the program flow advances to step ST14 where a negative response NACK(13) is transmitted from the monitor slave device 4. In the following step ST15, the scheduled packet sequence number SNw (=13) at the time of transmission is stored.

In frame 6, following the transmission of the negative response NACK(13), the monitor slave device 4 receives the image data DT(18). In this case, the scheduled packet sequence number SNw remains to be 13. In this case also, as the scheduled packet sequence number SNw (=13) is not updated, the monitor slave device 4 transmits the negative response NACK(13) once again in the following frame 7.

In frame 7, the master device 1 receives the negative response NACK(13) which was transmitted from the monitor slave device 4 in frame 6 and relayed by the relay device 5, and as a response, transmits the image data DT(13) selected from the image data stored in the buffer unit 1o by using the slot following the slot for receiving the negative response NACK(13). The image data DT(24), DT(25), DT(26) was transmitted from the master device 1 by using the three slots preceding the slot used for receiving the negative response NACK(13).

In frame 7, as the monitor slave device 4 has not received the image data DT(13), similarly as in the process for frame 6, the monitor slave device 4 receives the image data DT(20), DT(21), DT(23) in that order, and stores it in the data storage unit 4n similarly as in step ST6 for frame 6 while the stored packet sequence numbers SNm (=20, 21, 23) corresponding to this image data are stored in the sequence number storage unit 4m. The master device 1 also receives the image data DT(22) via the slot immediately following that used for transmitting the negative response NACK, and stores this data in the data storage unit 4n while the corresponding stored packet sequence number SNm (=22) is stored in the sequence number storage unit 4m.

In frame 8, the monitor slave device 4 receives the image data DT(24), DT(25) in that order, and then receives the image data DT(13). The reception process at this time is described in the following with reference to the control flow shown in FIG. 10.

As the received packet sequence number SNr is 13, and the scheduled packet sequence number SNw is 13, the program flow advances from step ST1 to step ST2 where the image data DT(13) is forwarded to the image processing unit 4c. In the following step ST3, the scheduled packet sequence number SNw is updated to 14 before the program flow advances to step ST4. At this time, as the sequence number storage unit 4m stores the stored packet sequence numbers SNm (=14-25) and the data storage unit 4n stores the corresponding image data DT(14)-DT(25) as a result of the data storage processes for frame 5 onward. Therefore, in step ST4 shown in FIG. 10, it is determined that the stored packet sequence numbers SNm (=14-25) contains a number coinciding with the scheduled packet sequence number SNw of 14 so that the program flow advances to step ST8.

In step ST8, the corresponding image data DT(14) is read out from the data storage unit 4n, and is forwarded to the image processing unit 4c. In the following step ST9, the scheduled packet sequence number SNw is updated to 15 (=1+14) before the program flow returns to step ST4.

In step ST4 also, as the updated scheduled packet sequence number SNw (=15) coincides with one of the stored sequence numbers SNm (=15), the program flow returns to step ST8 to read out the corresponding image data DT(15) form the data storage unit 4n and forward it to the image processing unit 4c.

In this manner, the steps ST4, ST8 and ST9 are repeated until the stored packet sequence number of 25 has come to be processed. As a result, before the missed piece of image data DT(13) is resent, other pieces of image data DT(14)-DT(25) are stored in the master device 1 instead of being discarded, and as soon as the image data DT(13) is resent, the image processing for the image data DT(13)-DT(25) is immediately performed in the monitor slave device 4 to resume the image processing that has been suspended owing to the error in the packet reception. At the same time, the scheduled packet sequence number SNw is updated, and the scheduled packet sequence number SNw becomes 26 upon completion of the processing of the image data DT(25).

Once the image data DT(25) is forwarded to the image processing unit 4c and the scheduled packet sequence number SNw is updated to 26, as there is no sequence number corresponding to this number stored in the sequence number storage unit 4m, a disagreement is detected in step ST4 so that the program flow of FIG. 10 is concluded.

In the following control action of the transmission process shown in FIG. 18, it is determined in step ST11 that the scheduled packet sequence number SNw is updated from the previous value (Yes in ST11) so that the program flow advances to step ST15 to update the scheduled packet sequence number SNw before concluding the program flow of FIG. 18. Thereafter, the transmission and reception process shown in FIGS. 10 and 18 is performed.

Thus, according to a certain aspect of the present invention, in a wireless communication system for performing a wireless communication based on a time division method between two wireless communication devices, data packets are transmitted from one wireless communication device to another. If the other wireless communication device fails to receive a packet in a correct order or has received a packet that does not coincide with a scheduled packet sequence number, the incorrectly received packet is stored in a storage unit, and released after the packet that is correctly received later so that the packets are obtained in the correct order. When the scheduled packet number fails to be updated in a certain frame, and the scheduled packet fails to be received in a succeeding frame, the other wireless communication device transmits a resend request in the succeeding frame.

Although the present invention has been described in terms of preferred embodiments thereof, it is obvious to a person skilled in the art that various alterations and modifications are possible without departing from the scope of the present invention which is set forth in the appended claims.

The contents of the original Japanese patent applications on which the Paris Convention priority claim is made for the present application as well as the contents of the prior art references mentioned in this application are incorporated in this application by reference.

The wireless communication system of the present invention is highly useful in cases where a relay device is used in a communication between a master device and a slave device because the relay device does not immediately transmits a resend request even when the data packets are not received in a consecutive order, and can continue the data communication without interruption.

The invention claimed is:

1. A wireless communication system for performing a wireless communication between two wireless communication devices based on a time division method, the system comprising:
one of the wireless communication devices configured to transmit a plurality of packets according to an order of sequence numbers tagged to the packets; and
the other wireless communication device including a scheduled packet sequence number setting unit for providing a scheduled packet sequence number of an expected packet and updating the scheduled packet sequence number according to packets that have been correctly received, a resend control unit that, at prescribed periodic timings, determines an update condition of the scheduled packet sequence number and transmits, to the one wireless communication device, a negative response signal for requesting a resending of a packet depending on the determined update condition, and a storage unit for temporarily storing at least the packet that is received in an incorrect order, and releasing the stored packet in a correct order in relation with the remaining packets that are received from the one wireless communication device;
the resend control unit comparing the scheduled packet sequence number at each prescribed period timing with the scheduled packet sequence number at a previous prescribed periodic timing, and transmitting the negative response signal when the scheduled packet sequence number at each prescribed period timing has failed to be updated from the scheduled packet sequence number at the previous prescribed periodic timing and at least one packet is stored in the storage unit at each prescribed periodic timing.

2. The wireless communication system according to claim 1, further comprising a relay device for relaying packets between the two wireless communication devices.

3. The wireless communication system according to claim 1, wherein the one wireless communication device is provided with a storage unit for storing a packet identical to each of the packets transmitted therefrom, the storage unit being configured to discard the oldest packet stored therein and store the new packet when the packet storage unit has become full.

4. The wireless communication system according to claim 1, wherein the other wireless communication device is configured to set the first scheduled packet sequence number to a sequence packet number of a first packet received by the other wireless communication device.

5. The wireless communication system according to claim 1, wherein the resend control unit of the other wireless communication device is configured to transmit a positive response at each prescribed periodic timing when the scheduled packet sequence number is updated.

6. The wireless communication system according to claim 1, wherein the resend control unit of the other wireless communication device is configured to transmit a positive response at each prescribed periodic timing when the scheduled packet sequence number is not updated, and no packet is stored in the storage unit.

7. The wireless communication system according to claim 1, wherein the scheduled packet sequence number setting unit of the other wireless communication device is configured such that when a packet corresponding to the scheduled packet sequence number is detected in the storage unit, the scheduled packet sequence number is updated to a succeeding packet sequence number.

8. The wireless communication system according to claim 7, wherein when a packet corresponding to the scheduled packet sequence number is detected in the storage unit, the scheduled packet sequence number is updated to a succeeding packet sequence number, and this process is repeated until applicable packets are exhausted from the storage unit.

9. The wireless communication system according to claim 1, wherein the one wireless communication device comprises a camera slave device for a monitoring purpose, and the other wireless communication device comprises a master device configured to receive image data from the camera slave device.

10. The wireless communication system according to claim 9, further comprising a relay device for relaying packets between the camera slave device and the master device, the relay device including a buffer unit for temporarily storing packets transmitted from the camera slave device to the master device.

11. The wireless communication system according to claim 1, wherein the one wireless communication device comprises a master device configured to receive image data from a camera slave device, and the other wireless communication device comprises a monitor slave device for reconstructing an image from image data transmitted from the master device to the monitor slave device.

12. The wireless communication system according to claim 11, further comprising a relay device for relaying packets between the master device and the monitor slave device, the relay device including a buffer unit for temporarily storing packets transmitted from the master device.

13. The wireless communication system according to claim 1, wherein the one wireless communication device is configured to transmit a control signal indicating a sequence number of each current frame to the other wireless communication device, each frame consisting of a plurality of time slots for wireless communication.

14. The wireless communication system according to claim 13, wherein the prescribed periodic timings are selected such that the other wireless communication device transmits a resend control signal to the one wireless communication device once in each frame.

15. A wireless communication device for a wireless communication system for performing a wireless communication with another wireless communication device belonging to the same system based on a time division method, the wireless communication device comprising:
    a scheduled packet sequence number setting unit for providing a scheduled packet sequence number of an expected packet and updating the scheduled packet sequence number according to packets that have been correctly received, a resend control unit that, once in each time frame of a plurality of time frames, determines an update condition of the scheduled packet sequence number and transmits, to the other wireless communication device, a negative response signal for requesting a resending of a packet depending on the determined update condition, and a storage unit for temporarily storing at least the packet that is received in an incorrect order, and releasing the stored packet in a correct order in relation with the remaining packets that are received from the other wireless communication device;
    each of the plurality of time frames having the same length in time; and
    the resend control unit transmitting the negative response signal when the scheduled packet sequence number has failed to be updated and at least one packet is stored in the storage unit.

16. A wireless communication method for performing a wireless communication between two wireless communication devices based on a time division method, the method comprising the steps of:
    causing one of the wireless communication devices to transmit a plurality of packets according to an order of sequence numbers tagged to the packets;
    setting a scheduled packet sequence number of an expected packet in the other communication device;
    updating the scheduled packet sequence number according to packets that have been correctly received by the other wireless communication device;
    temporarily storing, in a storage unit, at least the packet that is received by the other communication device in an incorrect order;
    determining, in each of a plurality of time frames, an update condition of the scheduled packet sequence number by comparing the scheduled packet sequence number in a current time frame of the plurality of time frames with the scheduled packet sequence number in a previous time frame of the plurality of time frames;
    releasing the stored packet from the storage unit in a correct order in relation with the remaining packets that are received by the other wireless communication device from the one wireless communication device; and
    transmitting a negative response signal from the other wireless communication device to the one wireless communication device depending on the determined update condition in each of the plurality of time frames, the negative response signal requesting a resending of a packet;
    wherein the negative response signal is transmitted from the other wireless communication device to the one wireless communication device when the scheduled packet sequence number in the current time frame has failed to be updated from the scheduled packet sequence number in the previous time frame and at least one packet is stored in the storage unit in the current time frame.

* * * * *